United States Patent
Jiang

(10) Patent No.: US 11,791,925 B2
(45) Date of Patent: Oct. 17, 2023

(54) METHOD, APPARATUS AND SYSTEM FOR DETERMINING MULTIPATH INTERFERENCE (MPI) ON AN OPTICAL LINK

(71) Applicant: HUAWEI TECHNOLOGIES CO., LTD., Shenzhen (CN)

(72) Inventor: Zhiping Jiang, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 87 days.

(21) Appl. No.: 17/521,128

(22) Filed: Nov. 8, 2021

(65) Prior Publication Data

US 2023/0142092 A1    May 11, 2023

(51) Int. Cl.
*H04B 10/07* (2013.01)
*H04J 14/02* (2006.01)
*H04B 10/079* (2013.01)

(52) U.S. Cl.
CPC ...... *H04J 14/0227* (2013.01); *H04B 10/0795* (2013.01); *H04J 14/0221* (2013.01)

(58) Field of Classification Search
CPC .............. H04J 14/0227; H04J 14/0221; H04B 10/0795
See application file for complete search history.

(56) References Cited

U.S. PATENT DOCUMENTS

| | | | | |
|---|---|---|---|---|
| 5,677,781 A * | 10/1997 | Mori | ...................... | H04B 10/07 |
| | | | | 359/341.1 |
| 5,778,016 A * | 7/1998 | Sucha | ..................... | G01S 17/18 |
| | | | | 372/38.1 |
| 5,903,375 A * | 5/1999 | Horiuchi | .............. | H04B 10/071 |
| | | | | 398/28 |
| 5,999,258 A | 12/1999 | Roberts | | |
| 6,317,214 B1 * | 11/2001 | Beckett | ................ | G01M 11/331 |
| | | | | 356/73.1 |
| 7,415,206 B1 | 8/2008 | Birk et al. | | |
| 7,925,158 B2 * | 4/2011 | Turukhin | ........... | H04B 10/0775 |
| | | | | 398/16 |
| 8,094,502 B1 * | 1/2012 | Bellorado | .......... | G11C 16/3468 |
| | | | | 365/185.23 |
| 10,419,117 B2 * | 9/2019 | Tanimura | ............. | H04B 10/616 |
| 11,018,705 B1 * | 5/2021 | Holder | ................. | H04B 1/0483 |
| 11,405,104 B1 * | 8/2022 | Hahn | ................. | H04B 10/0791 |

(Continued)

FOREIGN PATENT DOCUMENTS

WO     2018228429 A1    12/2018

*Primary Examiner* — Tanya T Motsinger

(57) ABSTRACT

There is provided a method, apparatus and system for determining multipath interference (MPI) in optical communications. It is object of embodiments of the present disclosure to provide an effective, low-cost way of detecting or measuring MPI. To effectively detect and measure the MPI, multiple zero-power gaps are inserted into the transmission signal (optical signal) in time domain. In some embodiments, at least some of the zero-power gaps inserted in the main signal do not overlap the zero-power gaps of the reflection of the main signal. Using the zero-power gaps contained the main signal and the reflection (where applicable), power inside and outside the zero-power gaps are determined. Then, the strength of the MPI is determined based on the determined power inside and outside the zero-power gaps.

24 Claims, 13 Drawing Sheets

(56) References Cited

U.S. PATENT DOCUMENTS

| | | | |
|---|---|---|---|
| 2003/0169427 A1* | 9/2003 | Muro | H04B 10/503 356/450 |
| 2003/0198253 A1* | 10/2003 | Ahmed | H04L 27/22 370/335 |
| 2004/0028013 A1* | 2/2004 | Fitton | H04B 1/7107 370/335 |
| 2007/0133493 A1* | 6/2007 | Maruhashi | H04B 7/04 370/342 |
| 2008/0088507 A1* | 4/2008 | Smith | G01S 19/10 342/464 |
| 2008/0231842 A1* | 9/2008 | Brendel | G01M 11/3145 356/73.1 |
| 2008/0232238 A1* | 9/2008 | Agee | H04L 27/2627 370/208 |
| 2009/0023477 A1* | 1/2009 | Staudte | H04W 16/28 455/562.1 |
| 2012/0040602 A1* | 2/2012 | Charland | H04K 3/43 455/67.11 |
| 2014/0198311 A1* | 7/2014 | L'Heureux | G01M 11/3118 356/73.1 |
| 2015/0003269 A1 | 1/2015 | Chun et al. | |
| 2015/0358852 A1* | 12/2015 | Richley | H04W 28/0278 370/328 |
| 2015/0358938 A1* | 12/2015 | Richley | H04W 64/006 455/456.1 |
| 2016/0041065 A1* | 2/2016 | L'Heureux | G01M 11/3154 356/73.1 |
| 2016/0266234 A1* | 9/2016 | Pearce | G01S 13/74 |
| 2018/0102842 A1* | 4/2018 | Rasmussen | H04B 10/0775 |
| 2018/0132016 A1* | 5/2018 | Kamalov | H04Q 11/0062 |
| 2018/0205461 A1* | 7/2018 | Alfiad | H04J 14/02 |
| 2020/0067595 A1* | 2/2020 | Huang | H04B 10/25891 |
| 2020/0107263 A1* | 4/2020 | Boger | H04W 52/0216 |
| 2020/0150637 A1* | 5/2020 | Yates | G05B 19/41885 |
| 2020/0228774 A1* | 7/2020 | Kar | H04N 13/111 |
| 2020/0314745 A1* | 10/2020 | Yi | H04W 72/23 |
| 2020/0386540 A1* | 12/2020 | Hseih | G01S 7/4915 |
| 2021/0048531 A1* | 2/2021 | Medower | G01S 7/4815 |
| 2021/0166124 A1* | 6/2021 | Schäfer | G06N 3/08 |
| 2021/0314729 A1* | 10/2021 | Morgenthau | H04B 17/23 |
| 2021/0314917 A1* | 10/2021 | Lee | H04W 72/02 |
| 2022/0006501 A1* | 1/2022 | Kim | H04B 7/0632 |
| 2022/0057465 A1* | 2/2022 | Xie | G01R 33/543 |
| 2022/0128611 A1* | 4/2022 | Almog | G01S 3/14 |
| 2022/0159596 A1* | 5/2022 | Kim | H04B 17/336 |
| 2022/0232549 A1* | 7/2022 | Yeo | H04L 5/0044 |

* cited by examiner

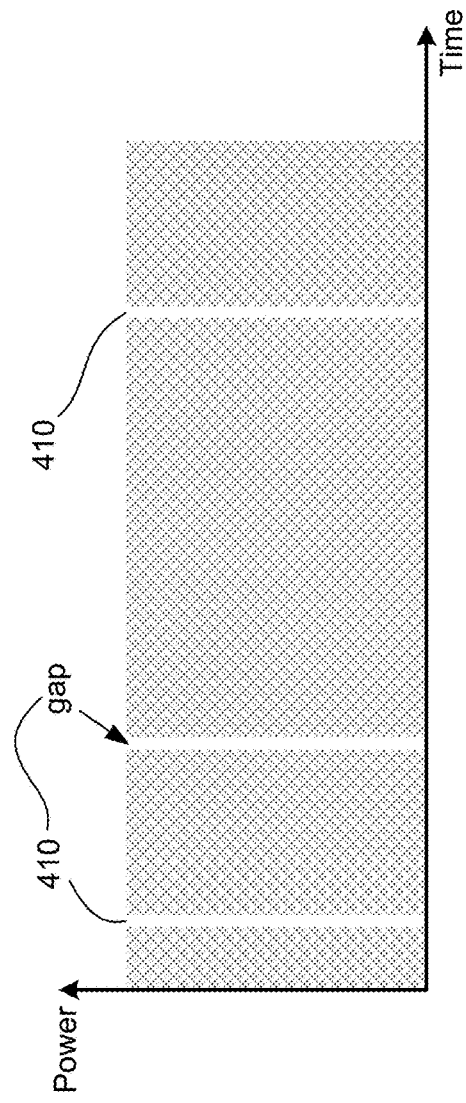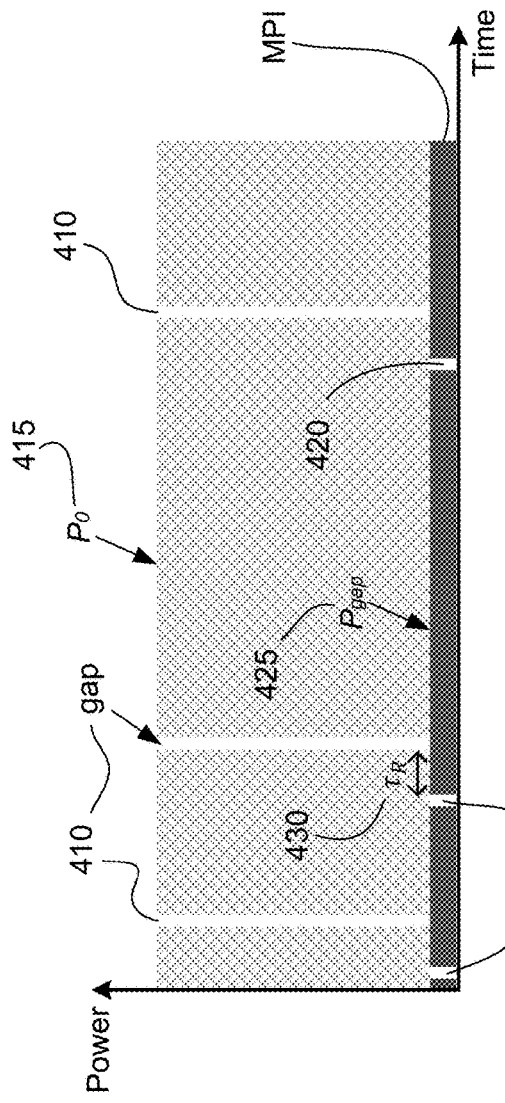
FIG. 4A
FIG. 4B

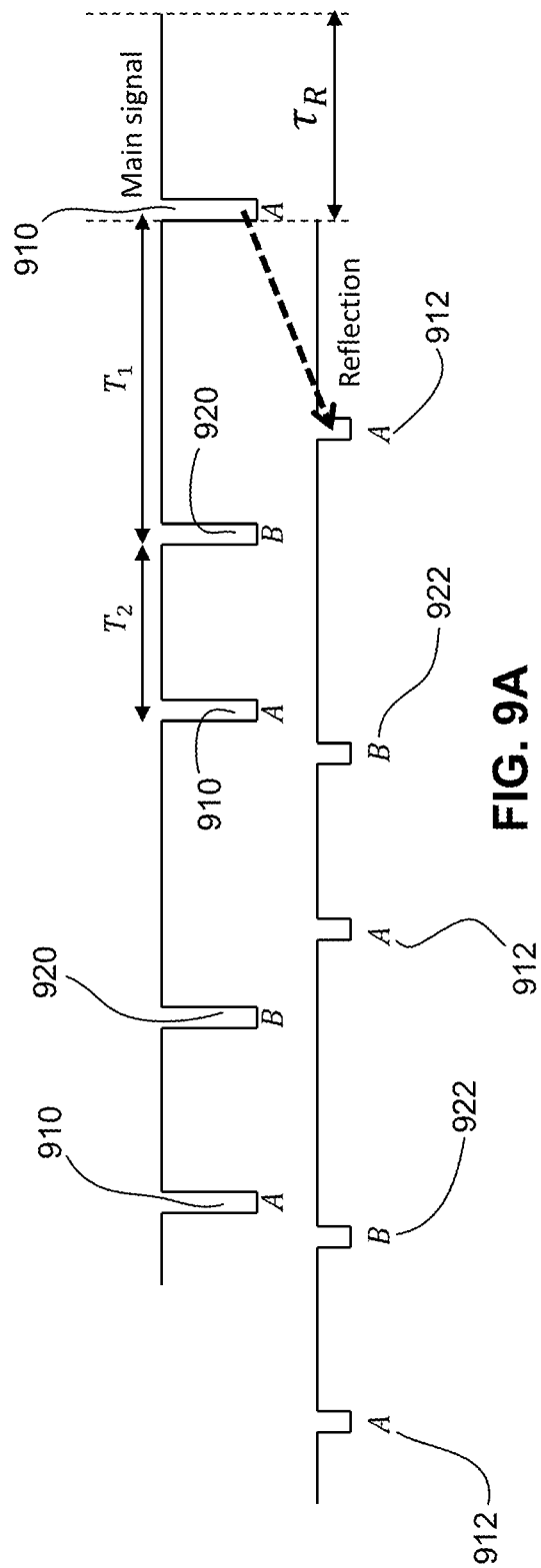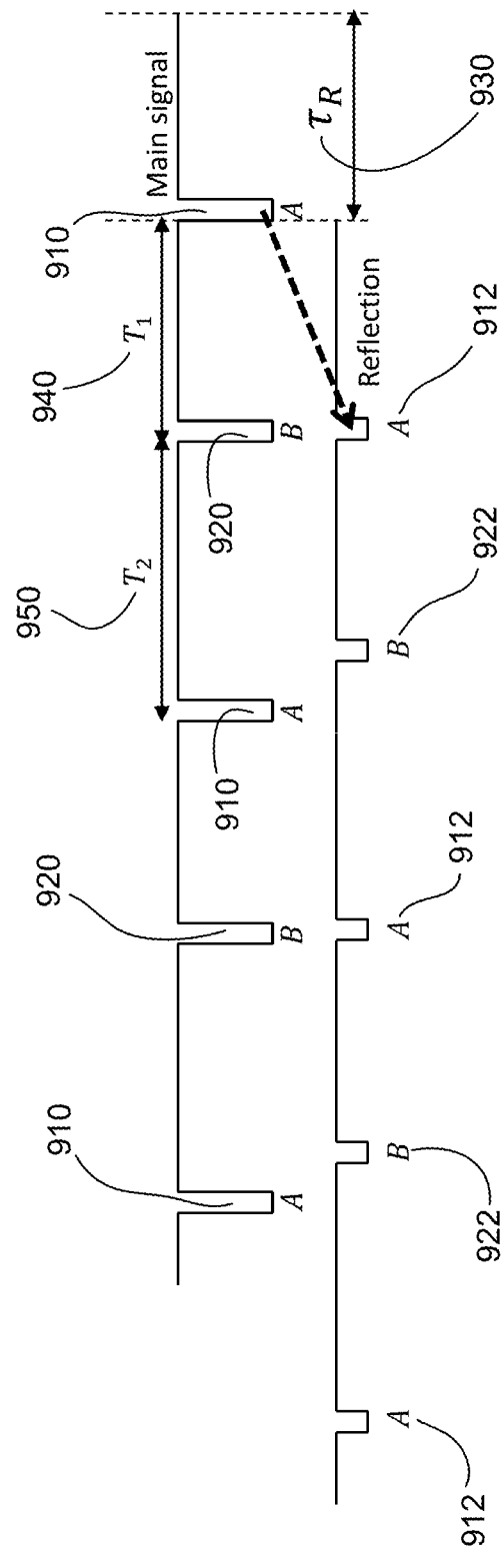

METHOD, APPARATUS AND SYSTEM FOR DETERMINING MULTIPATH INTERFERENCE (MPI) ON AN OPTICAL LINK

CROSS-REFERENCE TO RELATED APPLICATIONS

This is the first application filed for the present invention.

FIELD OF THE INVENTION

The present invention pertains to the field of optical communications and in particular to a method, apparatus and system for determining multipath interference (MPI) in optical communications.

BACKGROUND

In optical communications, signals are transmitted through optical fiber links such as point-to-point dense wavelength division multiplexing (DWDM) links. FIG. 1 illustrates an example of a point-to-point dense wavelength division multiplexing (DWDM) link for signal transmission in an optical fiber system. As illustrated in FIG. 1, the point-to-point DWDM link 100 consists of transmitters (Tx) 110, DWDM multiplexer 120, optical amplifiers 130, fiber spans 140, DWDM de-multiplexer 150 and receivers (Rx) 160. The maximum number of channels/wavelengths is generally in the range of 80 to 120 with 50 GHz spacing in the C-band. The channels are multiplexed by the DWDM multiplexer 150 and transmitted to the destination through optical amplifiers 130 and optical fiber spans 140. The optical amplifiers 130 are provided to compensate for loss of the optical fiber spans 140 and potentially various other components in the link 100. The optical amplifiers 130 are communicatively connected to each other or connected to the multiplexer 120 and the de-multiplexer 150 using the fiber span 140. The fiber span 140 is the transmission medium conveying channels, and Standard Single Mode Fiber (SSMF) (G.652) and ELEAF (G.655) are most widely used types of fibers. Each fiber span 140 can be a few kilometers to hundreds of kilometers or more in length (i.e. span length is a few kilometers to hundreds of kilometers or more). There may be one to a few tens of fiber spans 140 in one point-to-point DWDM link 100. At the destination, channels (signals) are DWDM de-multiplexed and finally received by the receivers (Rx) 160.

When transmitting the signals (channels), multipath interference (MPI) can occur anywhere in the optical fiber link (i.e. anywhere between the transmitter and receiver pair). MPI can occur when an optical signal can be transmitted to the destination via more than one path. This can be caused by double Rayleigh backscattering (DRBS) in the fiber, as well as multi-reflections.

MPI degrades the quality of signals (channel quality) and the performance of optical fiber systems (e.g. transmission performance). In order to resolve or mitigate the problems caused by MPI in the optical fiber system, various testing and experiments are typically performed in the lab. However, it is very challenging to reproduce the problems occurred at the site in the lab. To reproduce such problems, it is required to detect the MPI and know the amount thereof. However, there is no effective way of measuring the MPI or determining an amount of MPI in the optical fiber link.

Therefore there is a need for a method, apparatus and system for determining multipath interference, that is not subject to one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide a method, apparatus and system for determining multipath interference (MPI) on a transmission link in an optical fiber system. In accordance with embodiments of the present invention, there is provided a method for determining multipath interference (MPI) in an optical communication. The method includes, for example by a receiver or monitoring device, receiving a main signal superimposed with a reflection of the main signal. Said main signal includes one or more zero-power gaps in time domain. The method further includes determining power outside the zero-power gaps of the main signal and power inside the zero-power gaps of the main signal, and determining strength of the MPI based on the power outside the zero-power gaps of the main signal, the power inside the zero-power gaps of the main signal or both.

In some embodiments, the one or more zero-power gaps induce one or more corresponding zero-power gaps in the reflection of the main signal, and at least some of the zero-power gaps of the main signal is non-overlapping in time with the corresponding zero-power gaps of the reflection. In some embodiments, a duration of each zero-power gap is greater than one symbol length in time.

The zero-power gaps may be uniformly or non-uniformly distributed in time. In some embodiments where the zero-power gaps are non-uniformly distributed in time, the method further includes measuring a first power within a first type of zero-power gap of the main signal and a second power within a second type of zero-power gap of the main signal, determining a difference between the first power and the second power, and determining the MPI based at least in part on the difference. Here, the first type is defined as being non-overlapping with all of the zero-power gaps in the reflection, and the second type is defined as being overlapping with a respective one of the zero-power gaps in the reflection.

In some other embodiments where the zero-power gaps are non-uniformly distributed in time, the method further includes measuring, at a first time, a first time-resolved power within a first zero-power gap of the main signal, where the first zero-power gap is partially overlapping with a respective one of the zero-power gaps in the reflection, and the first power is indicative of power with MPI. The method further includes measuring, at a second time, a second time-resolved power within the first zero-power gap of the main signal, where the second power is indicative of power without MPI. The method further includes determining a difference between the first power and the second power, and determining the MPI based at least in part on the difference. The first time-resolved power and the second time-resolved power may be obtained as a function of time.

In accordance with embodiments of the present invention, there is provided a method for supporting determination of multipath interference (MPI) in an optical communication system. The method includes, for example by a transmitter, inserting one or more zero-power gaps into a main signal in time domain, and transmitting the main signal with the one or more zero-power gaps. Here, power outside the zero-power gaps of the main signal, power inside the zero-power gaps of the main signal or both is used for determining strength of the MPI.

In some embodiments, the one or more zero-power gaps induce one or more corresponding zero-power gaps in a reflection of the main signal, and at least some of the zero-power gaps of the main signal is non-overlapping in time with the corresponding zero-power gaps of the reflection. In some embodiments, a duration of each zero-power gap is greater than one symbol length in time.

The zero-power gaps may be uniformly or non-uniformly distributed in time. In some embodiments where the zero-power gaps are non-uniformly distributed in time, inserting the one or more zero-power gaps includes inserting a first type of zero-power gaps of the main signal, and inserting a second type of zero-power gaps of the main signal. Here, the first type is defined as being non-overlapping with all of the zero-power gaps in the reflection, and the second type is defined as being overlapping with a respective one of the zero-power gaps in the reflection.

In some embodiments where the zero-power gaps are uniformly distributed in time, timing of transmission of the first type of zero-power gap of the main signal, the second type of zero-power gap of the main signal, or both, is adjusted to induce said first type of zero-power gap and said second type of zero-power gap at a corresponding receiver.

In accordance with embodiments of the present invention, there is provided another method for determining multipath interference (MPI) in an optical communication system. The method includes transmitting or receiving a main signal superimposed with a reflection of the main signal, where said main signal includes one or more zero-power gaps in time domain. The strength of the MPI is determined based on a combination of power outside the zero-power gaps of the main signal and power inside the zero-power gaps of the main signal.

In accordance with embodiments of the present invention, there are provided an apparatus for determining multipath interference (MPI) in an optical communication system or supporting determination of MPI in an optical communication system. The apparatus can be a transmitter, a monitoring device, or a receiver, configured to perform correspond to any or all of the steps of the methods and features described above.

In accordance with embodiments of the present invention, there is provided a method which corresponds to a combination of the transmitter and receiver methods as described above. The method includes a set of operations by a transmitter and a set of operations by a receiver. The set of operations by the transmitter includes inserting one or more zero-power gaps into a main signal in time domain. The one or more zero-power gaps induce one or more corresponding zero-power gaps in a reflection of the main signal, at least some of the zero-power gaps of the main signal being non-overlapping in time with the corresponding zero-power gaps of the reflection. The set of operations by the transmitter includes transmitting the main signal with the one or more zero-power gaps. The set of operations by the receiver includes receiving the main signal superimposed with the reflection of the main signal; determining power outside the zero-power gaps of the main signal and power inside the zero-power gaps of the main signal; and determining strength of the MPI based on the power outside the zero-power gaps of the main signal, the power inside the zero-power gaps of the main signal or both.

In accordance with embodiments of the present invention, there is provided an optical communication system for determining multipath interference (MPI) comprising a transmitter and a receiver. The transmitter is configured to insert one or more zero-power gaps into a main signal in time domain, said one or more zero-power gaps inducing one or more corresponding zero-power gaps in a reflection of the main signal, at least some of the zero-power gaps of the main signal being non-overlapping in time with the corresponding zero-power gaps of the reflection. The transmitter is further configured to transmit the main signal with the one or more zero-power gaps. The receiver includes a MPI detection block operatively associated with a digital signal processor. The receiver is configured to receive the main signal superimposed with the reflection of the main signal. The receiver is configured to determine power outside the zero-power gaps of the main signal and power inside the zero-power gaps of the main signal. The receiver is configured to determine strength of the MPI based on the power outside the zero-power gaps of the main signal, the power inside the zero-power gaps of the main signal or both.

Embodiments have been described above in conjunctions with aspects of the present invention upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which:

FIG. 4A illustrates zero-power gaps inserted in the signal to be transmitted by a transmitter, in accordance with embodiments of the present disclosure.

FIG. 4B illustrates zero-power gaps inserted in the signal received at a receiver, in accordance with embodiments of the present disclosure.

FIG. 9A illustrates the non-alignment of the zero-power gaps in the main signal and the zero-power gaps in the reflection of the main signal.

FIG. 9B illustrates the adjusted location of the zero-power gaps in the main signal such that one type of the zero-power gaps in the main signal overlaps with another type of the zero-power gaps in the reflection of the main signal, in accordance with embodiments of the present disclosure.

It will be noted that throughout the appended drawings, like features are identified by like reference numerals.

DETAILED DESCRIPTION

The present disclosure provides a method, apparatus and system for determining multipath interference (MPI) in optical communications. Specifically, it is object of embodiments of the present disclosure to provide an efficient and effective way of detecting or measuring MPI. According to embodiments, multiple zero-power gaps are inserted into the transmission signal (optical signal) in the time domain, to facilitate detecting and measuring of the MPI in the optical signal. At least some of the zero-power gaps inserted in the main signal do not overlap the zero-power gaps of the reflection of the main signal. In the present disclosure, the main signal can be understood as, unless stated otherwise, a transmission signal (optical signal) that arrives from a transmitter at a receiver via a direct path. The MPI can be measured using the zero-power gaps regardless of the type of MPI (i.e. regardless whether it is DRMS induced MPI or reflection induced MPI).

Figure 2:
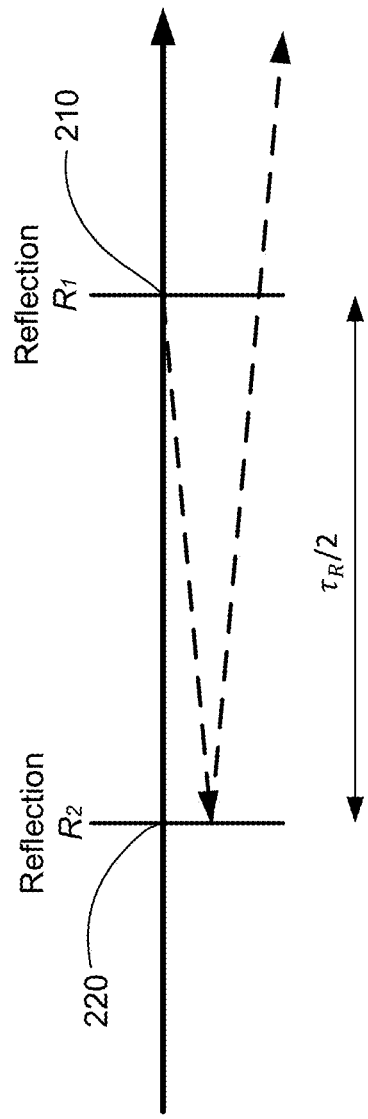
FIG. 2 illustrates an example of multi-reflection induced multipath interference (MPI).

As stated above, MPI can cause degradation in quality of transmitting signals in the optical fibers. MPI can be caused by for example multi-reflections or double Rayleigh backscattering (DRBS) in the fiber. FIG. 2 illustrates an example of multi-reflection which can induce MPI. In FIG. 2, an optical signal or light transmitting through an optical fiber from left to right. This light is first reflected at the reflection point 210 to propagate in the backward direction. Then, the backward travelling light is reflected again at the reflection point 220 to propagate in the forward direction. At each reflection point, typically only a portion of light is reflected. These reflections are illustrated using dashed line in FIG. 2. Provided that P(t) is the power of the main signal, the power of the reflection can be expressed as $RP(t+\tau_R)$, where R is the total reflectivity of both reflections and $\tau_R$ is the time delay due to this double reflection. The distance between the two reflection points 210 and 220 is related to the time delay $\tau_R$, as $\tau_R/2$ would be indicative of the time taken for the reflected light to travel between the two reflection points 210 and 220. R is indicative of the strength of the reflection induced MPI.

Figure 3:
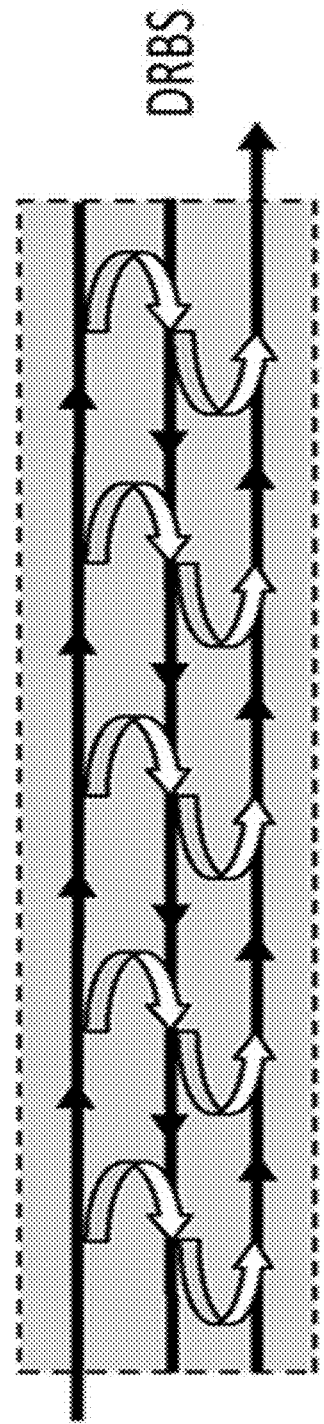
FIG. 3 illustrates an example of double Rayleigh backscattering (DBRS) induced MPI.

FIG. 3 illustrates an example of double Rayleigh backscattering (DBRS) which can induce MPI. Rayleigh backscattering refers to predominantly or high-intensity elastic scattering of light that is reflected (scattered) back to its origin. DRBS is induced by multiple sequential instances of Rayleigh backscattering, such that the backscattered light is subsequently backscattered again to travel in the forward direction. Provided that P(t) is the power of the main signal at time t, the power of the DBRS can be expressed as $RP_{DBRS}(t)$, where $P_{DBRS}(t)$ is uncorrelated to P(t). It should be noted that DRBS includes multiple instances (in fact modelled as a substantially infinite number of instances) of DBRS events. Therefore, its power waveform, $P_{DBRS}(t)$, is often modelled as a weighted sum of these substantially infinite number of delayed versions of the power of the main signal, P(t). Put another way, DRBS is typically considered to be stationary and statistically independent of the main signal.

MPI, whether it is multi-reflection induced MPI or DBRS induced MPI, is an issue for optical communications as it can severely affect the performance of optical communication systems (e.g. link performance, signal quality). However, there is to date no effective, low-cost way of detecting and measuring MPI in the optical communication systems. Indeed, MPI is notoriously difficult to localize or quantify. The present disclosure provides a method, apparatus and system for determining multipath interference (MPI) in optical communications. Various embodiments of the present disclosure provide for a direct reflection detection capability, at limited to no cost (e.g. no additional hardware cost). This may be achieved by taking advantages of the capabilities of digital signal processors (DSP) contained in the modern transceivers.

According to embodiments of the present disclosure, to measure MPI, zero-power gaps are inserted into a signal (e.g. optical signal) to be transmitted by transmitters. No power would be observed or measured in association with the signal when said zero-power gap is present. A zero power gap can be inserted by ceasing optical transmission (i.e. setting transmitter optical output to zero) for a short period of time. This can be achieved in a variety of ways such as by causing a data modulator to send symbols with zero (0) amplitude, causing a transmitter laser or diode to cease activity, or by blocking or rerouting optical output. Among these, sending symbols with zero amplitude may be a simple way of inserting zero power gaps in the signal. Multiple zero-power gaps (repeated gaps) may be inserted into the signal in order to increase the power measurement accuracy, as the power measurement accuracy can be improved by averaging the power measured over the multiple zero-power gaps. The time interval between two zero-power gaps can be uniform or non-uniform. In some embodiments, the time interval between adjacent zero-power gaps can be adjusted by a controller to achieve certain features (e.g. one type of zero-power gap in the main signal overlaps or aligns with another type of zero-power gap in the reflection of the main signal), as illustrated below or elsewhere in the present disclosure. In various embodiments, the size or duration of the zero-power gap is a few symbols or even much greater than a few symbols in time; however, the exact duration of the zero-power gaps is not necessarily critical. In some embodiments, the signal DSP frame structure may be considered when determining one or more features of the zero-power gap, such as gap duration and gap location. In some embodiments, there can be online and/or offline mode. In the online mode, the zero power gaps are inserted within a signal which carries data supporting an end use. In the offline mode, the zero power gaps are inserted within a signal which is used for calibration or testing purposes, while communication of data supporting an end use is interrupted.

FIG. 4A illustrates zero-power gaps 410 inserted in the signal to be transmitted by a transmitter, in accordance with embodiments of the present disclosure. Referring to FIG. 4A, there are multiple zero-power gaps inserted into the transmitted signal (residing in the shaded area) in order to increase the power measurement accuracy. As stated above, no power will be observed or measured in association with the signal when the inserted zero-power gap is present. The time interval between the zero-power gaps may be non-uniform or uniform. In the uniform case, the time interval between each pair of successive zero-power gaps is the same. In the non-uniform case, the time interval between at least one pair of successive zero-power gaps is different than the time interval between at least one other pair of successive zero-power gaps.

FIG. 4B illustrates zero-power gaps inserted in the signal, as the signal appears at a receiver, in accordance with embodiments of the present disclosure. Referring to FIG. 4B, $P_0$ 415 refers to the total power observed outside of the gaps at the receiver 410, due to superposition of the main signal with the main signal's reflections due to MPI. $P_{gap}$ 425 refers to the power of reflections due to MPI only, as observed inside of the zero-power gaps. $\tau_R$ 430 refers to an example timing offset between zero-power gaps in the main signal and zero-power gaps that may occur in the reflections in response to the zero-power gaps in the main signal. Such zero-power gaps may occur in the reflections in some cases but not others. For example, in cases where MPI is induced due to multi-reflection as in FIG. 2 (e.g. a due to a finite, even number of reflections), it is anticipated that the reflections will exhibit zero-power gaps. However, in other cases such as DBRS induced MPI, zero-power gaps 420 may not be observed in the reflections, or such gaps may be subject to dispersion so that they appear for example as shallower but wider gaps, or each appears as a series of shallower gaps. In any event, the timing offset $\tau_R$ 430 is equal to the time difference between the occurrence of a zero-power gap 410 within the main signal and occurrence of the nearest zero-power gap 420 within the MPI, when present, as illustrated in FIG. 4B. In some embodiments, the zero-power gaps in the main signal are introduced, at the transmitter, so that for each zero-power gap 410 in the main signal, the corresponding time delay $\tau_R$ 430 is non-zero, or alternatively is greater than a predetermined threshold value. In other embodiments, the zero-power gaps in the main signal are introduced, at the transmitter, so that for some but not all zero-power gaps 410 in the main signal, the corresponding time delay $\tau_R$ 430 is non-zero, or alternatively greater than a predetermined threshold value. Such other embodiments will be described in more detail elsewhere herein. As such, some or all of the zero-power gaps 410 of the main signal are observed, at the receiver, at different times than the zero-power gaps 420 in the reflection occur at different times at the receiver (i.e. they do not overlap).

As illustrated in FIG. 4B, no power will be observed in direct association with the main signal when the zero-power gap 410 is present, and no power will be observed in direct association with a reflection when the zero-power gap 420 is present. However, the power inside the gaps 410 (i.e. $P_{gap}$ 425) is not zero due to the presence of reflections. This is because, as discussed above, timing of the zero-power gaps 410 is configured so that they are observed at the receiver, at different times than the zero-power gaps 420. Provided that the zero-power gaps 410 of the main signal and the zero-power gaps 420 of the reflection do not overlap, the power for MPI can be determined for example by measuring, at the receiver, the signal power inside the gaps 410. This is because the main signal is not present inside the gaps 410, so the power for the main signal will not be measured (or measured as zero) inside the gaps 410. The power for the main signal can be obtained for example by measuring the power outside the zero-power gaps 410. In various embodiments, the power for the main signal can be obtained by measuring the received power at points in time which are outside the zero-power gaps 410 (and possibly also outside the gaps 420). As the power for MPI and the power of the main signal can be determined, the (e.g. absolute or relative) strength of the MPI can be determined using one or both of these power values. For example, at least in some embodiments, the power ratio $P_{gap}/P_0$ is used to indicate the strength of MPI.

Figure 1:
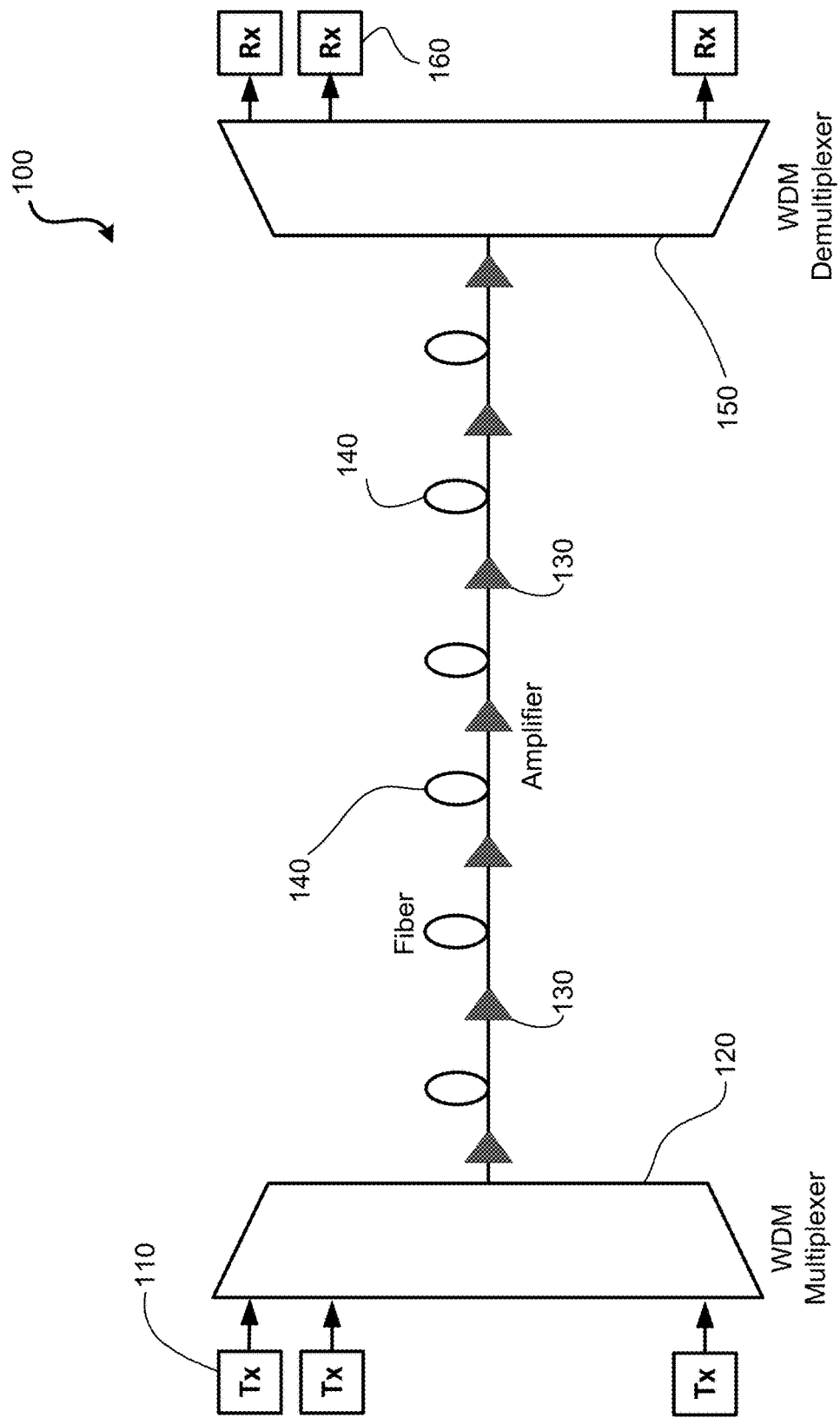
FIG. 1 illustrates an example of a point-to-point dense wavelength division multiplexing (DWDM) link for signal transmission in an optical fiber system.

According to embodiments, MPI can be detected and measured anywhere in the link (e.g. anywhere in the point-to-point DWDM link illustrated in FIG. 1). However, in some embodiments, the MPI is detected and measured at the receiver. This can be advantageous as additional hardware costs can be avoided, because the receiver can be used to perform detection and measurement operations. It should be also noted that MPI can be detected and measured using a separate hardware device (e.g. designated MPI detector).

It is expected that the zero-power gaps 420 in the reflection or the MPI light will be present for reflection induced MPI, as illustrated in FIG. 4B. As such, the method for detecting and measuring MPI, as it is illustrated above, can be used for reflection induced MPI. However, it should be noted that the above method can be also used for DRBS induced MPI which does not necessarily have clearly defined gaps in the reflection or MPI light. For example, due to a continuum of reflections in the DBRS model, gaps can be smoothed or averaged out over time. Put another way, the above method, in principle, can be used to monitor both reflection induced MPI and DRBS induced MPI by measuring the power in the main signal gap. However, in the case of DBRS induced MPI, zero-power gaps such as gaps 420 may not be induced. Accordingly, techniques leveraging such zero-power gaps in the MPI portion of the signal (e.g. as described with respect to FIGS. 8 to 10) may need to be modified or may be inapplicable in some cases. For example, if the received signal includes other type of noises such as amplifier spontaneous emission (ASE) noise, fiber nonlinear noise, and transceiver noise, while the power inside the gap in the main signal still can be measured and the measurements of power can be utilized, the techniques in FIGS. 8 to 10 for distinguishing power for MPI from the power for other type of noises (e.g. ASE noise, fiber nonlinear noise, and transceiver noise) may not be as readily applicable, because the power for MPI cannot as readily be separately measured from the power for other type of noises (e.g. ASE noise, fiber nonlinear noise, and transceiver noise) in absence of the zero-power gap in the reflections in the DBRS model.

Figure 5:
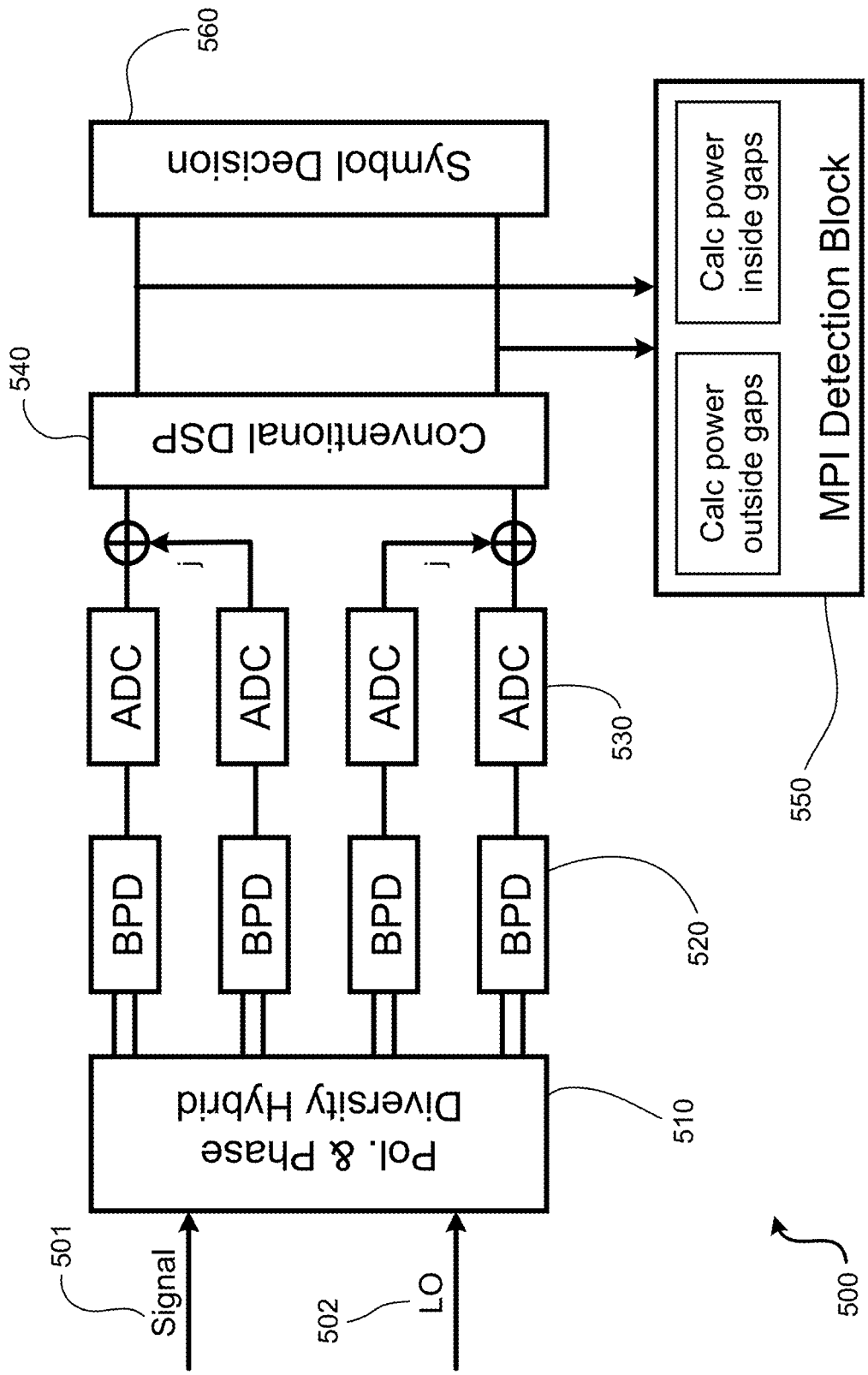
FIG. 5 illustrates a coherent receiver containing a MPI detection block determining power inside and outside zero-power gaps, in accordance with embodiments of the present disclosure.

FIG. 5 illustrates a coherent receiver containing a MPI detection block configured for determining power inside and outside zero-power gaps, in accordance with embodiments of the present disclosure. Referring to FIG. 5, the coherent receiver 500 includes a polarization and phase diversity hybrid mixer 510, a balanced photo detector 520, an analog-to-digital converter 530, a conventional digital signal processor (DSP) 540 and a symbol decision block 560. Each of these components is operatively connected as illustrated in FIG. 5. The polarization and phase diversity hybrid mixer 510 receives the incoming optical signal 501 as well as output of a local oscillator (LO) 502. Then, the received optical signal is mixed with the output of the LO 502 by the polarization and phase diversity hybrid mixer 510, the balanced photo detector 520 and the analog-to-digital converter 530, in turn. Then, the modified signal is conveyed to the conventional DSP 540 for further processing, and finally delivered to the symbol decision block 560. Variations of a coherent receiver itself can be used as will be readily understood by a worker skilled in the art.

Further referring to FIG. 5, the coherent receiver 500 further comprises the MPI detection block 550. The MPI detection block 550 can be operatively connected to the conventional DSP 540, specifically after the conventional DSP 540 (and before the symbol decision block 560) as illustrated in FIG. 5. In some embodiments, the MPI detection block 550 can be integrated into the conventional DSP 540, for example in-between various components of the conventional DSP 540. By further configuring a receiver's existing DSP to also perform MPI detection, embodiments of the present technology can be implemented with limited to no additional hardware.

The MPI detection block 550 is configured to determine (e.g. calculate) power inside (and also potentially outside) zero-power gaps (e.g. power inside and outside zero-power gaps 410 in FIG. 4). It is useful to detect or measure the power inside and outside zero-power gaps (e.g. power inside and outside zero-power gaps 410 in FIG. 4), particularly to facilitate detecting or measuring the MPI (e.g. determining the strength of MPI). The exact method of detecting the power inside and outside zero-power gaps is readily understood by and obvious to a worker skilled in the art. Detecting the power inside and outside zero-power gaps may involve synchronization of the signals, especially for coherent receivers.

In some embodiments, zero-power gaps are inserted in a predetermined location of the data frame. The receiver can easily know and detect zero-power gaps in the signal as zero-power gaps are always placed in a known (e.g. fixed or predictable) location of the data frame. In some embodiments, zero-power gaps may be inserted in every few data frames or in more than one location within a data frame, so that overhead can be controlled. In some embodiments, detecting zero-power gaps may be based on an analysis of received signal power levels. For example, when the signal power level drops suddenly and temporarily, a zero-power gap can be identified at that time instance, and the lowest power level, or an average of lowest power levels, can be taken as the signal power inside the zero-power gap (i.e. the power due to MPI). In some embodiments, by measuring the timing and duration of such signal power level drops and comparing it against expected timing and duration, zero-power gaps can be more reliably identified in contrast to other types of sudden power drop events, if applicable.

Other approaches can also be used. For example a transmitter can inform the receiver of the timing, duration, or both, of zero-power gaps to aid in their identification. A transmitter can send a special signal in advance of a zero-power gap and identifying same. The receiver can instruct the transmitter on when to insert zero-power gaps, their length, or both, and use this information to facilitate detection of the zero-power gaps.

According to embodiments, the coherent receiver 500 receives a main signal (optical signal) and a reflection of the main signal. This main signal and its reflection are superimposed at the receiver. The main signal may be transmitted by a transmitter (not shown). The reflection of the main signal may occur in the course of signal transmission due to reflective conditions at one or more locations across the link (e.g. optical fiber span). When or before transmitting the main signal, multiple zero-power gaps, in the time domain, are inserted into the main signal. As such, the reflection may also include corresponding zero-power gaps in time domain. These zero-power gaps in the reflection are offset, in time, from those in the main signal, due to the longer path that the reflection inherently has to travel. In other words, each of the main signal and the reflection may include multiple zero-power gaps (zero-power gaps 410 and zero-power gaps 420 in FIG. 4). However, it should be noted that MPI is, in many typical application scenarios, relatively rare and when there is MPI fault there is typically only one double reflection MPI. Therefore in such cases MPI can be effectively detected and fixed.

In order to detect or measure the MPI (e.g. determine the strength of MPI), the coherent receiver 500 determines the signal power inside and outside the zero-power gaps (e.g. $P_O$ 415 and $P_{gap}$ 425 in FIG. 4), respectively. In various embodiments, it is the MPI detection block 550 that determines or calculates the signal power inside and outside the zero-power gaps. The power inside and outside the zero-power gaps can be calculated using the instantaneous electrical field of one or more streams. For example, in a coherent receiver, there are 4 signals (i.e. in-phase and quadrature phase for each of two orthogonal polarizations). Provided that $E_i(t)$ is the instantaneous electrical field of stream i, the instantaneous power at time t can be determined using the following equation (where < > denotes the average operator):

$$P(t) = \sum_i \langle |E_i(t)|^2 \rangle$$

In various embodiments, the power inside the zero-power gaps (e.g. $P_{gap}$ 425 in FIG. 4) is determined using the data samples in the gaps only (e.g. data samples in the zero-power gaps 410). Similarly, the power outside of the zero-power gaps can be determined using the data samples outside the gaps (e.g. data samples outside the zero-power gaps 410).

Once the power inside and outside the zero-power gaps of the main signal are determined, the MPI can be detected and measured. In various embodiments, the coherent receiver 500 (e.g. MPI detection block 550 or another component in the coherent receiver 500 or another device possibly separate from the receiver for determining MPI) determines the strength of the MPI. This strength of the MPI may be based on one or both of the power inside the zero-power gaps and the power and outside the zero-power gaps, as determined by the MPI detection block 550. For example, the power ratio of the power inside and outside the zero-power gaps determined by the MPI detection block 550 may indicate the strength of MPI. In other words, provided that the power outside the zero-power gap is $P_0$ and the power inside the zero-power gap is $P_{gap}$, the power ratio $$\frac{P_{gap}}{P_0}$$

is indicative of the strength of MPI, or in dB unit, $$MPI_{dB} = 10\log_{10}\frac{P_{gap}}{P_0}.$$

It should be noted that, while the processes of measuring the power inside and outside the zero-power gaps (e.g. $P_0$ 415 and $P_{gap}$ 425 in FIG. 4) and determining strength of MPI are illustrated above using a coherent receiver (i.e. coherent receiver 500), the same can potentially be performed by non-coherent (direct detection) receivers. The same process can additionally or alternatively be performed by other devices which are separate from signal receivers, and which simply monitor the signals.

Figure 6A:
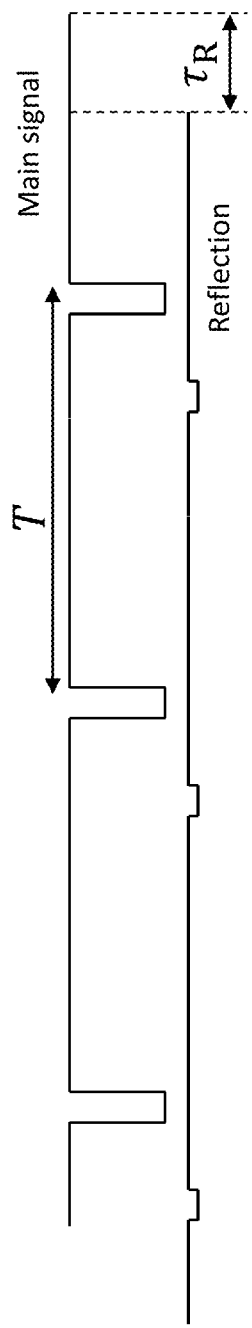
FIG. 6A illustrates the timing of the main signal and the reflection of the main signal where the zero-power gaps in the main signal and the zero-power gaps in the reflection are not aligned.
Figure 6B:
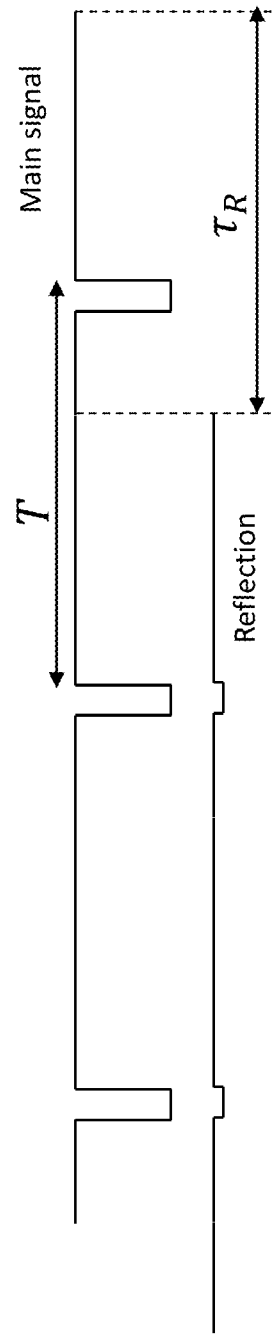
FIG. 6B illustrates the timing of the main signal and the reflection of the main signal where the zero-power gaps in the main signal and the zero-power gaps in the reflection are aligned.

For reflection induced MPI, the zero-power gaps in the main signal and the zero-power gaps in the reflection are typically not aligned in time (i.e. do not overlap), as illustrated in FIG. 6A. This means the reflection delay (i.e. $\tau_R$) is not an integer multiple of the interval of the zero-power gaps. In this case, the MPI can be detected and the strength of MPI can be determined for example using the methods as illustrated above. On the other hand, in the case that the zero-power gaps in the main signal and the zero-power gaps in the reflection are aligned (i.e. overlap) in time as illustrated in FIG. 6B, the method illustrated above may not be directly usable to detect the MPI and determine the strength of the MPI. This occurs when the reflection delay (i.e. $\tau_R$) is an integer multiple of the interval of the zero-power gaps. In such a case, it may be desired to adjust the time interval between the zero-power gaps. This can be done by inducing different time intervals between different successive pairs of zero-power gaps, for example. As an alternative, the time interval can be adjusted arbitrarily (e.g. pseudo-randomly) or the time interval can be adjusted based on feedback indicative of whether or not the zero-power gaps in the main signal and the zero-power gaps in the reflection are aligned or are tending toward (or away from) being aligned.

Figure 7:
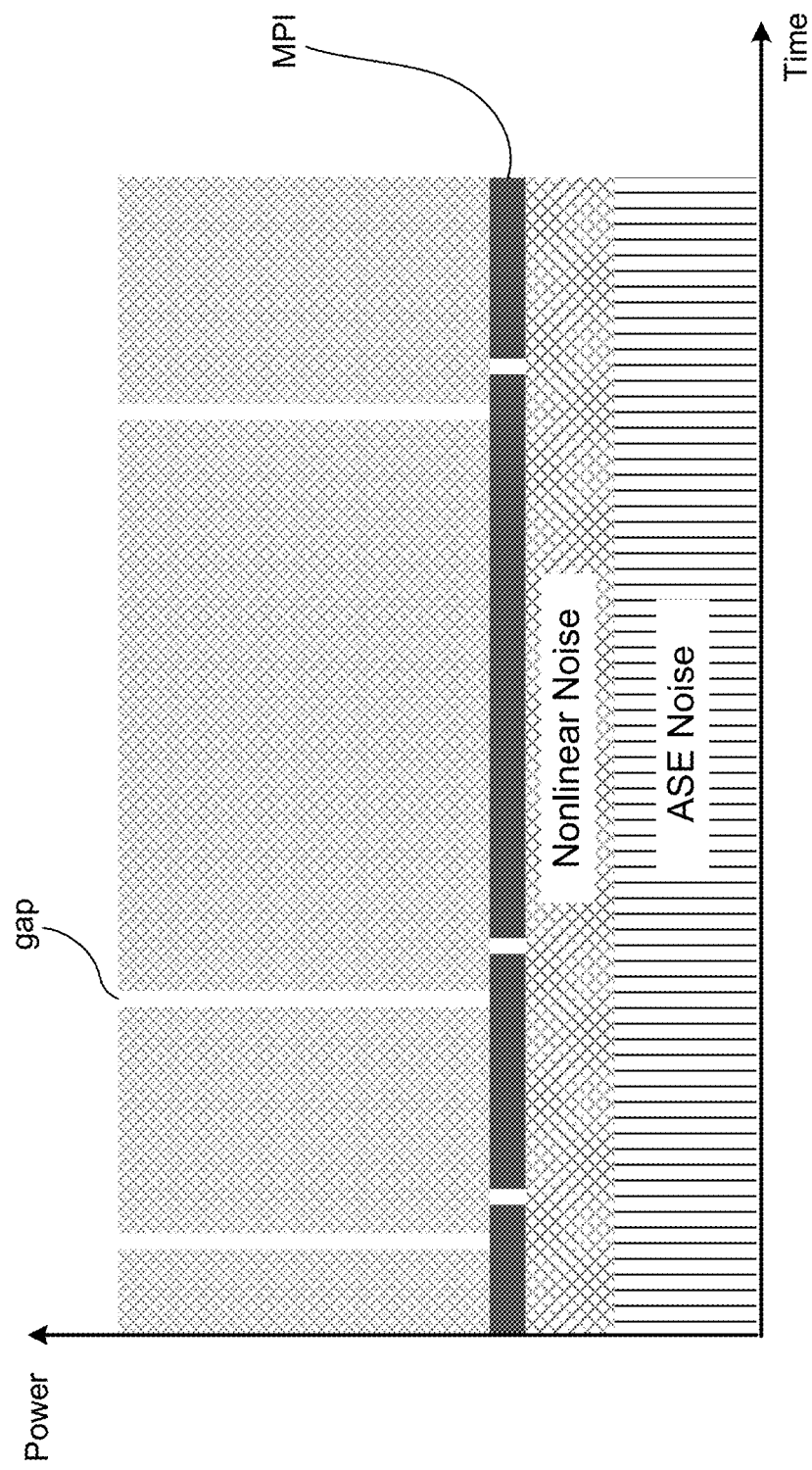
FIG. 7 illustrates zero-power gaps inserted in the main signal and the reflection of the main signal along with amplifier spontaneous emission (ASE) noise, fiber nonlinear noise and transceiver noise.

Furthermore, in dense wavelength division multiplexing (DWDM) optical communication systems, the optical signal will typically be transmitted to the receiver with other type of noises such as amplifier spontaneous emission (ASE) noise, fiber nonlinear noise, and transceiver noise, as illustrated in FIG. 7. In this case, the power measured (at the receiver) inside the zero-power gap is expected to include not only power due to MPI but also power due to these other noises. In other words, the power in the gap ($P_{gap}$) is the sum of power for MPI ($P_{MPI}$) and the power associated with other noises for example as illustrated in the following equation:

$$P_{gap}=P_{MPI}+E_{ASE}+P_{NLI}+P_{TRx},$$

where $P_{ASE}$ refers to the power associated with ASE noise, $P_{NLI}$ refers to the power associated with fiber nonlinear noise, and $P_{TRx}$ refers to the power associated with transceiver noise. It should be noted that powers associated with these noises are substantially constant and substantially independent of the use of zero-power gaps. As the power inside the zero-power gaps includes the power associated with other noises, the power for MPI may need to be separated from the power associated with noises in order to detect MPI and determine strength of MPI.

Figure 8:
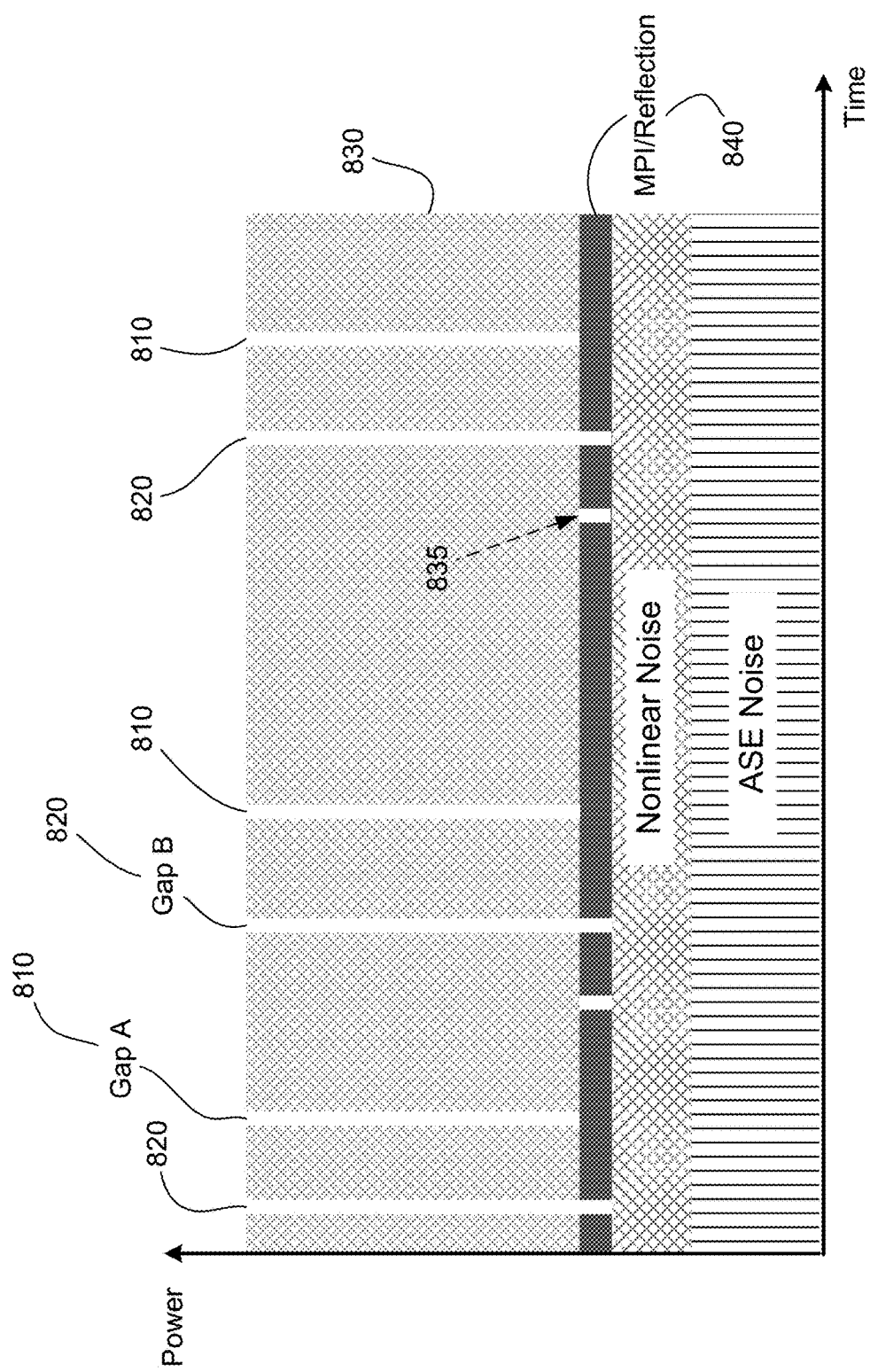
FIG. 8 illustrates non-uniform zero-power gaps inserted in the main signal and the reflection of the main signal using two different types of zero-power gaps, in accordance with embodiments of the present disclosure.

In order to resolve the problems illustrated above and FIG. 6B and FIG. 7, zero-power gaps can be produced at non-uniform time intervals. According to embodiments, two different types of zero-power gaps are inserted into the transmission signal (optical signal) in the time domain. This can render the time interval between zero-power gaps non-uniform as illustrated in FIG. 8. In particular, using two different types of zero-power gaps (i.e. non-uniform gap intervals), it is possible to have overlapped zero-power gaps and non-overlapped zero-power gaps between main signal and reflection. Referring to FIG. 8, there are two different types of zero-power gaps, the zero-power gaps A 810 and the zero-power gaps B 820, in the main signal 830. The zero-power gaps A 810 can be uniformly spaced in time from one another, and the zero-power gaps B 820 can also be uniformly spaced in time from one another. The zero-power gaps B can be timed so that each occurs before or after, but not at, the midpoint in time between the zero-power gap A which precedes it and the zero-power gap A which and follows it. As illustrated in FIG. 8, the zero-power gaps A 810 do not overlap any of the zero-power gaps 835 in the reflection 840. There is power due to reflection within the zero-power gap A 810 in the main signal, and therefore the zero-power gap A 810 can be used to detect noise within the gap and determine the power due to all noise, including MPI. On the other hand, the zero-power gap B 820 overlaps or is aligned with one of the zero-power gaps 835 in the reflection 840. There is no power due to reflection in the zero-power gap B 820. Therefore the zero-power gap B 820 alone would not be useful when detecting MPI (or reflection) and determining the strength of MPI. However, because the power in the zero-power gap A 810 includes the power due to MPI, and the power in the zero-power gap B 820 excludes the power due to MPI, the difference between the power in the zero-power gap A 810 and the power in the zero-power gap B 820 is indicative of the power due to MPI. Therefore, embodiments of the present invention are configured to determine the power due to MPI by determining such a difference, for example by performing a corresponding subtraction operation in a digital signal processor.

In more detail, according to embodiments, the reflection MPI can be detected and the strength of MPI can be determined using both of the zero-power gap A 810 and the zero-power gap B 820. Specifically, the power measured inside the zero-power gap A 810 would be indicative of the sum of the power for MPI ($P_{MPI}$) and the power associated with other noises such as ASE noise and fiber nonlinear noise (P ASE $P_{NLI}$). The power measured inside the zero-power gap B 820 would be indicative of the power associated with other noises only, as there is no reflection in the zero-power gap B 820 in the main signal. Therefore, the power difference between the power measured inside the zero-power gap A 810 and power measured inside the zero-power gap B 820 would be the measure of reflection or the power for MPI, according to the following equations:

$$P_{gap_A}=P_{MPI}+E_{ASE}+P_{NLI}$$

$$P_{gap_B}=E_{ASE}+P_{NLI}$$

$$\therefore P_{MPI}=|P_{gap_A}-P_{gap_B}|$$

Generally, without intentionally adjusting timings, the zero-power gaps in the main signal and the reflection cannot be expected to occur as illustrated in FIG. 8. That is, a situation in which the zero-power gap A 810 of the main signal does not overlap any gap in the reflection and the zero-power gap B 820 of the main signal overlaps the zero-power gap in the reflection cannot be expected to occur spontaneously with any reliability. In fact, for desirably narrow gaps, it is generally expected that none of the gaps in the main signal will overlap with gaps in the reflection. This is illustrated in FIG. 9A. In FIG. 9A, the zero-power gap A 910 of the main signal and the zero-power gap B 920 of the main signal do not overlap with any of the zero-power gaps 912, 922 in the reflection.

As such, in order to achieve the gap overlap condition illustrated above and FIG. 8 (i.e. such that the zero-power gap A 810 of the main signal does not overlap any gap in the reflection and the zero-power gap B 820 of the main signal overlaps a zero-power gap in the reflection), the locations of the zero-power gaps may be adjusted. The transmitter, or a part of the transmitter which introduces zero-power gaps (i.e. a gap generator) can be configured to perform such timing adjustments, either independently or in response to signals from the receiver indicating an adjustment should be performed. In other words, the gap alignment can be met by adjusting the timing of one of the zero-power gap A 910 or the zero-power gap B 920. Specifically, referring to FIG. 9B, the gap alignment can be met when the delay time $\tau_R$ 930 is an integer multiple of the interval time $T_1$ 940 or $T_2$ 950, as illustrated in the following equation.

$$\tau_R=MT_1, \text{ or } \tau_R=MT_2, \text{ where } M \text{ is an integer number}$$

It is noted that a worker skilled in the art readily understands how to achieve the gap overlap condition illustrated above and FIG. 8, and how to configure various hardware components. For example, information required for timing adjustments may be transmitted from the transmitter to the receiver through reserved or unused bits in high speed data. In another example, the transmitter is instructed to insert or adjust the zero-power gap in a predetermined fashion or based on a feedback received from the receiver.

It is also noted that, in FIG. 9B, the zero-power gaps A 910 of the main signal do not overlap any of the zero-power gaps 912, 922 of the reflection, while the zero-power gaps B 920 of the main signal partially or fully overlap (in time) the zero-power gaps 922 of the reflection.

Figure 10A:
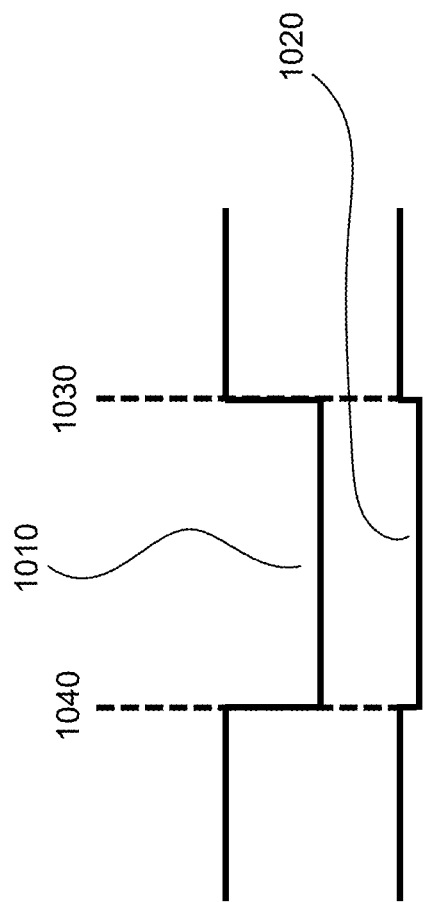
FIG. 10A illustrates perfect overlap of the zero-power gaps in the main signal and the reflection.
Figure 10B:
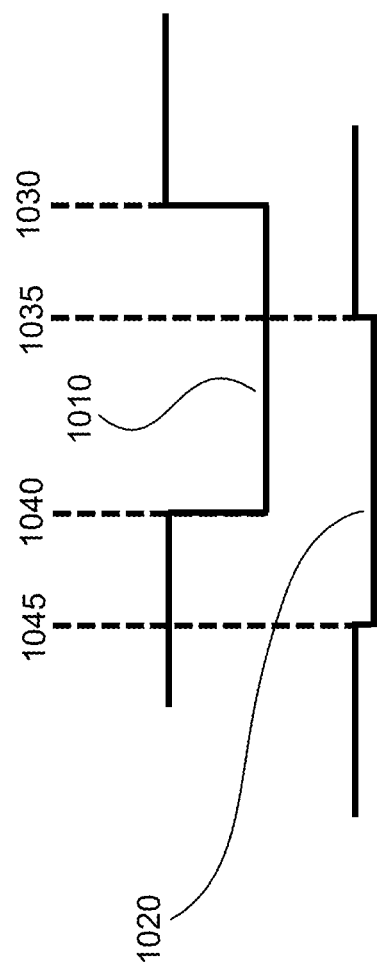
FIG. 10B illustrates partial overlap of the zero-power gaps in the main signal and the reflection.

FIGS. 10A and 10B illustrate perfect (full) and partial overlaps of the zero-power gaps in the main signal and the reflection. In the above description, it is assumed that the zero-power gaps in the main signal and the reflection are perfectly overlap, as illustrated in FIG. 10A, because perfect timing between the main signal and reflection is required for the power in the gaps to be representative of the reflection. In other words, referring to FIG. 10A, the zero power gap 1010 in the main signal and the zero power gap 1020 in the reflection both begin at a same first start time 1030 and end at a same first end time 1040. However, in some cases, the zero-power gaps in the main signal and the reflection overlap only partially, as illustrated in FIG. 10B. In other words, referring to FIG. 10B, the zero power gap 1010 in the main signal begins at a first start time 1030, and the zero power gap 1020 in the reflection begins at a second start time 1035 which is different from the first start time. Also, the zero power gap 1010 in the main signal ends at a first end time 1040, the zero power gap 1020 in the reflection ends at a second end time 1045 which is different from the first end time. Such different start and end times result in a partial overlap of the zero-power gaps. When the overlap is partial as illustrated in FIG. 10B, the power as averaged across an entire zero-power gap 1010 or 1020 may not be adequately indicative of the power of MPI and therefore may not be usable as an accurate measure for the MPI strength. However, the average power within a discernible portion of the zero-power gap 1010 (e.g. from time 1035 to 1030) may be adequately indicative of the power of MPI. Furthermore, the average power within the beginning portion of the zero-power gap 1020 (e.g. from time 1045 to time 1040) may be adequately indicative of the total main signal power. Yet further, the average power within a portion of the zero-power gap 1020 (e.g. from time 1040 to time 1035) may be adequately indicative of the total remaining noise power other than the main signal power and the power due to MPI (if present). It is noted that the total main signal power can be measured not only at the beginning portion of the zero-power gap 1020 (e.g. from time 1045 to time 1040) but also anywhere outside of the zero-power gap 1010 where there exists some MPI. Provided that MPI is typically very small, the inclusion of MPI or other noise does not significantly change the total main signal power.

According to embodiments, when the overlap is partial, time-resolved measurement is utilized to accurately determine the power for MPI or the strength of MPI. As such, the power in the zero-power gap in the main signal that partially overlaps with the zero-power gap of the reflection is measured or calculated multiple times during the duration of the gap. For example, when the duration of the partially overlapping zero-power gap is 10 symbols long in time, the power in the partially overlapping zero-power gap may be measured at least two times and up to 10 times. Time-resolved measurement refers to making multiple measurements during the duration of a zero-power gap. Such time-resolved measurement may facilitate determining both of the power with MPI and the power without MPI (i.e. the power difference between power measured in the gap where MPI is present and power measured in the gap where MPI is not present).

In one embodiment, if a detection of two substantially different power levels is made between successive measurements that are closer together than the width of the zero-power gap, then a partial overlap can be declared. If there is a partial overlap, some of the measurements can be used to indicate power with MPI and others within the same zero-power gap can be used to indicate power without MPI. In other words, when there are two substantially different power levels, the higher power level may be used to indicate power with MPI and the lower power level may be used to indicate power without MPI.

In another embodiment, different measurements within different zero-power gaps can be used in order to facilitate noise suppression.

Figure 10C:
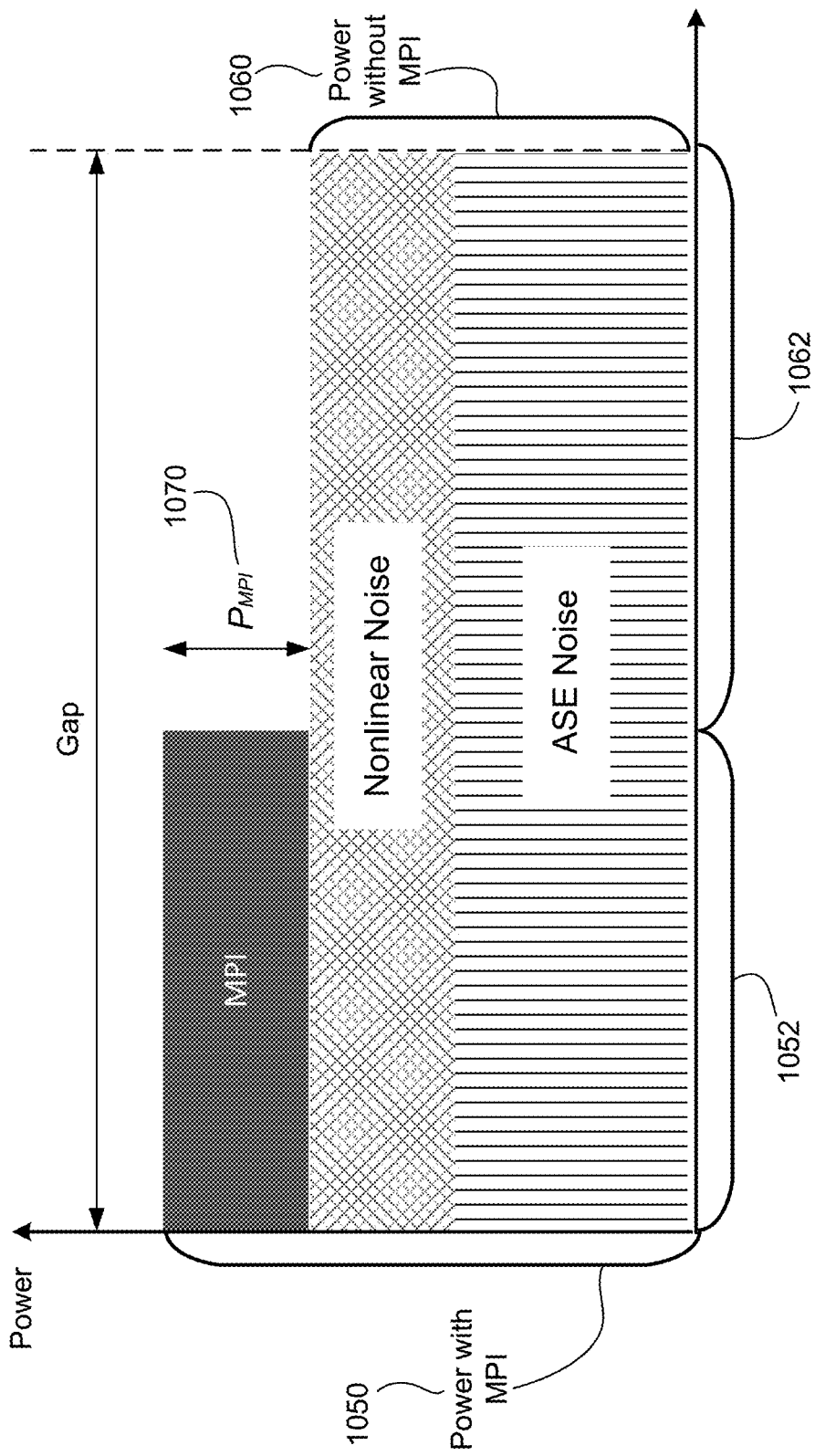
FIG. 10C illustrates the power with MPI and the power without MPI in the partially overlapping zero-power gap in the main signal.

FIG. 10C illustrates the total received signal power with MPI 1050 and the total received signal power without MPI 1060 in the partially overlapping zero-power gap of the main signal (e.g. partially overlapping gap in the main signal illustrated in in FIB. 10B). In particular, time interval 1052 is the time interval during which the gap in the main signal appears at the receiver, but the gap in the reflection has not yet reached the receiver, and time interval 1062 is the time interval during which the gap in the main signal and the gap in the reflection both appear at the receiver. Upon measuring the power with MPI 1050 and the power without MPI 1060, the power for MPI ($P_{MPI}$) 1070 can be calculated via subtraction. The power for MPI ($P_{MPI}$) 1070 is the difference between the power with MPI 1050 and the power without MPI 1060 according to the equation $P_{MPI}=|P_{with\ MPI}-P_{without\ MPI}|$ as shown in FIG. 10C. This process may be implemented in some embodiments where the partially overlapping zero-power gap is detected in the receiver DSP (e.g. DSP 540 in FIG. 5).

According to embodiments, when taking signal measurements involving partially overlapping zero-power gaps (of main signal and reflection) multiple times within a same instance of such a partially overlapping gap, it is useful to measure both the power with MPI 1060 and the power without MPI 1070. This way, the MPI power can be determined based on measurements which are close together. Therefore, to ensure that the power with MPI 1060 and the power without MPI 1070 are both measured, it can be beneficial to measure the power in the partially overlapping gaps multiple times, for example as many times as possible. For example, when the duration of the partially overlapping zero-power gap is 10 symbols long in time, the power in the partially overlapping zero-power gap may be measured 10 times. More generally, when the duration of a zero-power gap in the main signal is X symbols long, signal measurements can be made approximately every K symbols, where K<X, for example K≤X/2, K≤X/3, etc.

In some embodiments, as MPI's contribution to non-gap power (power measured outside the zero-power gap) is generally negligible, $P_{gap}$ (power inside the partially overlapping gaps) may be measured or obtained as a function of time. $P_{gap}$ as a function of time may be used to isolate $P_{MPI}$ from other noise contributions ($P_{ASE}+P_{NLI}+P_{TRx}$). It should be noted that, for reflection related MPI, the strength of MPI is sensitive to connector condition.

According to embodiments, measuring powers inside and outside zero-power gaps may be performed online (not traffic affecting) or offline (traffic affecting). In some embodiments, the size (duration) of the zero-power gaps is only a few symbols in time to limit the impact of introducing zero-power gaps on the spectral efficiency.

According to embodiments, zero-power gaps are repeatedly inserted (that is, multiple zero-power gaps are inserted) in the transmitting optical signal, and the repetition of the zero-power gap in the signal is compatible with DSP frame structure.

According to embodiments, some or all of the steps of the methods for determining MPI described above or elsewhere in the present disclosure, including determining powers inside and outside zero-power gaps and determining MPI strength, can be implemented in the receiver DSP or as a dedicated MPI detector (separate hardware device) along the optical fiber link.

According to embodiments, high speed (kHz) MPI detection may be performed because, in at least some modern optical signals, the baud rate is on the order of a few tens GHz or higher and therefore there can be thousands of gaps in a very short time period (e.g. 1 ms).

For discrete reflections, the time delay does not change, but the reflectivity may change if the connectors are disturbed. Therefore, in some embodiments, the MPI is monitored and the fibers/connectors are disturbed to detect the location of the reflections. A diagnostic method can thus be provided for, in which an embodiment of the present invention is implemented to measure MPI, and, concurrently, optical signal path elements, such as optical fibers or connectors, are disturbed. By observing changes to MPI in response to disturbing of different elements, a fault can be isolated.

Figure 11A:
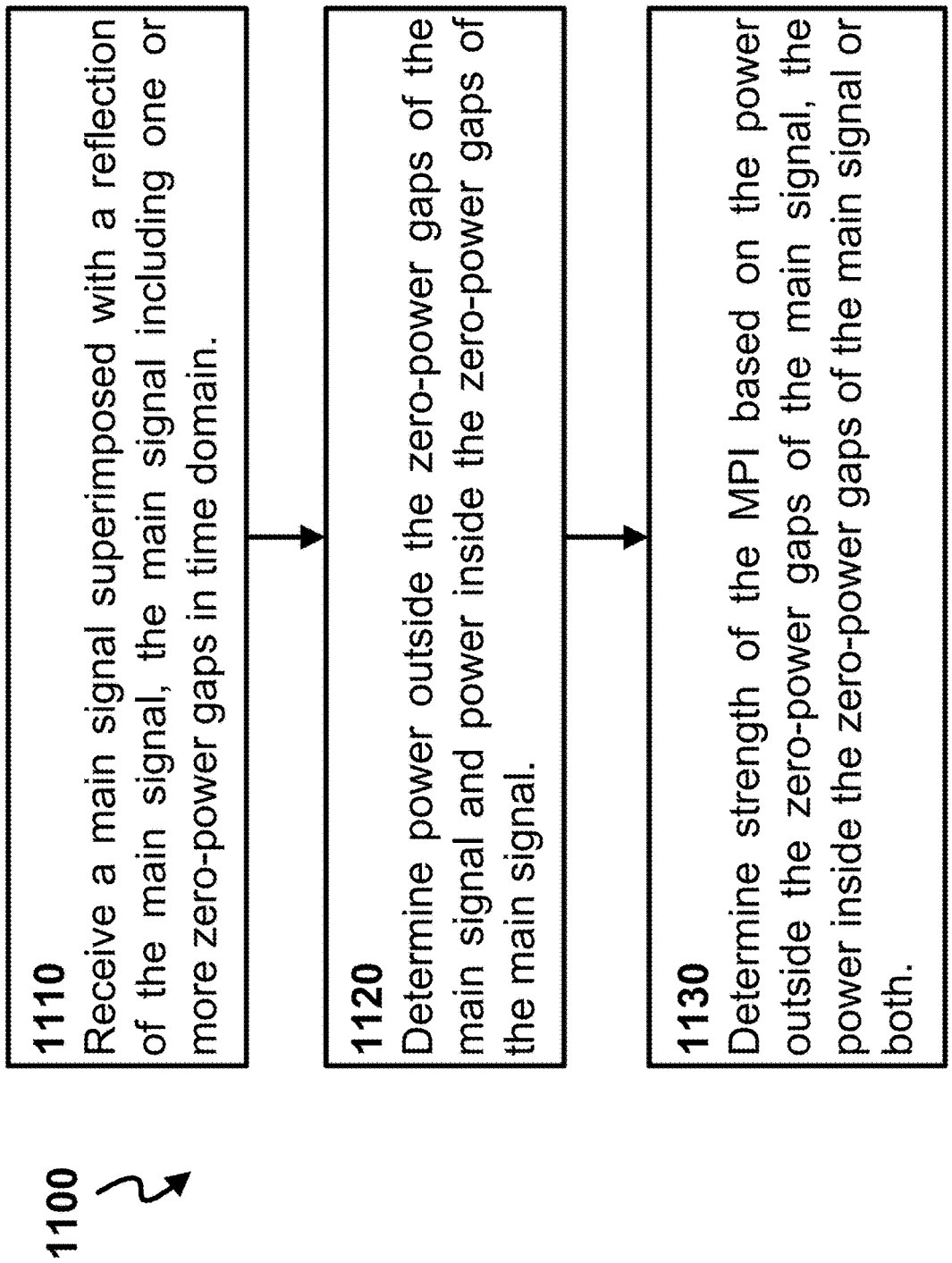
FIG. 11A illustrates a method, by a receiver, for determining multipath interference (MPI) in an optical communication system, in accordance with embodiments of the present disclosure.

FIG. 11A illustrates a method 1100 for determining multipath interference (MPI) in an optical communication system, in accordance with embodiments of the present disclosure. In various embodiments, the method 1100 is performed by a receiver, which may be a coherent receiver or non-coherent (direct detection) receiver.

The method 1100 includes receiving 1110 a main signal superimposed with a reflection of the main signal. Said main signal includes one or more zero-power gaps in time domain. The method 1100 further includes determining 1120 power outside the zero-power gaps of the main signal and power inside the zero-power gaps of the main signal, and determining 1130 strength of the MPI based on the power outside the zero-power gaps of the main signal, the power inside the zero-power gaps of the main signal or both.

In some embodiments, the one or more zero-power gaps induce one or more corresponding zero-power gaps in the reflection of the main signal, and at least some of the zero-power gaps of the main signal is non-overlapping in time with the corresponding zero-power gaps of the reflection. In some embodiments, a duration of each zero-power gap is greater than one symbol length in time.

The zero-power gaps may be uniformly or non-uniformly distributed in time. In some embodiments where the zero-power gaps are non-uniformly distributed in time, the method further includes measuring a first power within a first type of zero-power gap of the main signal and a second power within a second type of zero-power gap of the main signal, determining a difference between the first power and the second power, and determining the MPI based at least in part on the difference. Here, the first type is defined as being non-overlapping with all of the zero-power gaps in the reflection, and the second type is defined as being overlapping with a respective one of the zero-power gaps in the reflection.

In some other embodiments where the zero-power gaps are non-uniformly distributed in time, the method further includes measuring, at a first time, a first time-resolved power within a first zero-power gap of the main signal, where the first zero-power gap is partially overlapping with a respective one of the zero-power gaps in the reflection, and the first power is indicative of power with MPI. The method further includes measuring, at a second time, a second time-resolved power within the first zero-power gap of the main signal, where the second power is indicative of power without MPI. The method further includes determining a difference between the first power and the second power, and determining the MPI based at least in part on the difference. The first time-resolved power and the second time-resolved power may be obtained as a function of time.

Figure 11B:
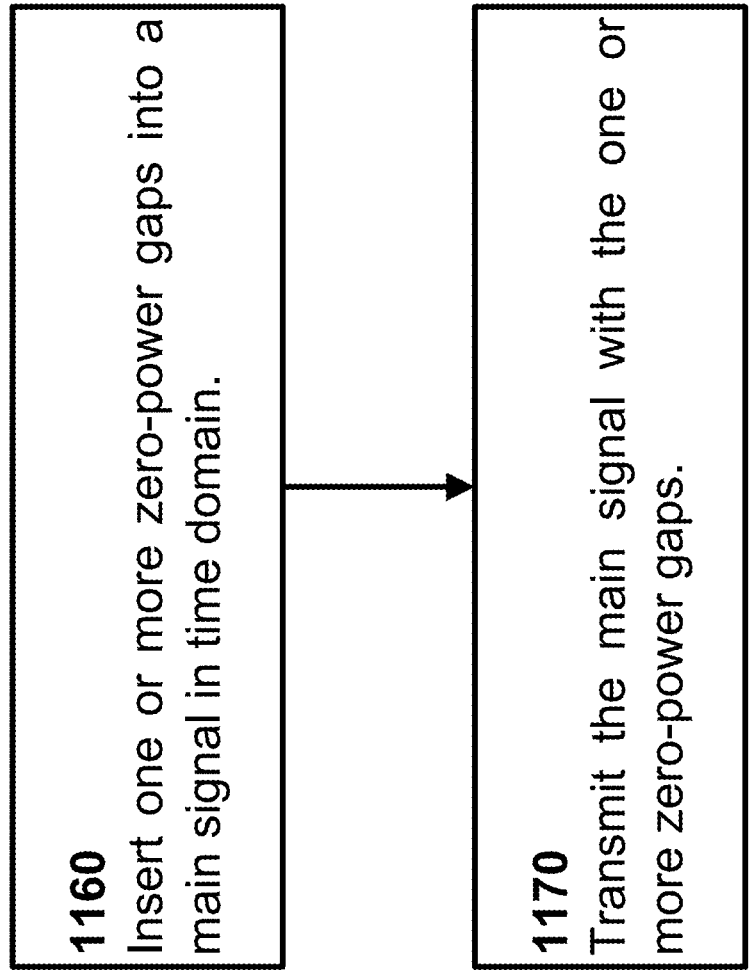
FIG. 11B illustrates a method, by a transmitter, for supporting determination of multipath interference (MPI) in an optical communication system, in accordance with embodiments of the present disclosure.

FIG. 11B illustrates a method 1150 for supporting determination of multipath interference (MPI) in an optical communication system, in accordance with embodiments of the present disclosure. In various embodiments, the method 1150 is performed by a transmitter.

The method 1150 includes inserting 1160 one or more zero-power gaps into a main signal in time domain, and transmitting 1170 the main signal with the one or more zero-power gaps. Here, power outside the zero-power gaps of the main signal, power inside the zero-power gaps of the main signal or both is used for determining strength of the MPI.

In some embodiments, the one or more zero-power gaps induce one or more corresponding zero-power gaps in a reflection of the main signal, and at least some of the zero-power gaps of the main signal is non-overlapping in time with the corresponding zero-power gaps of the reflection. In some embodiments, a duration of each zero-power gap is greater than one symbol length in time.

The zero-power gaps may be uniformly or non-uniformly distributed in time. In some embodiments where the zero-power gaps are non-uniformly distributed in time, inserting the one or more zero-power gaps includes inserting a first type of zero-power gaps of the main signal, and inserting a second type of zero-power gaps of the main signal. Here, the first type is defined as being non-overlapping with all of the zero-power gaps in the reflection, and the second type is defined as being overlapping with a respective one of the zero-power gaps in the reflection.

In some embodiments where the zero-power gaps are uniformly distributed in time, timing of transmission of the first type of zero-power gap of the main signal, the second type of zero-power gap of the main signal, or both, is adjusted to induce said first type of zero-power gap and said second type of zero-power gap at a corresponding receiver.

Figure 12:
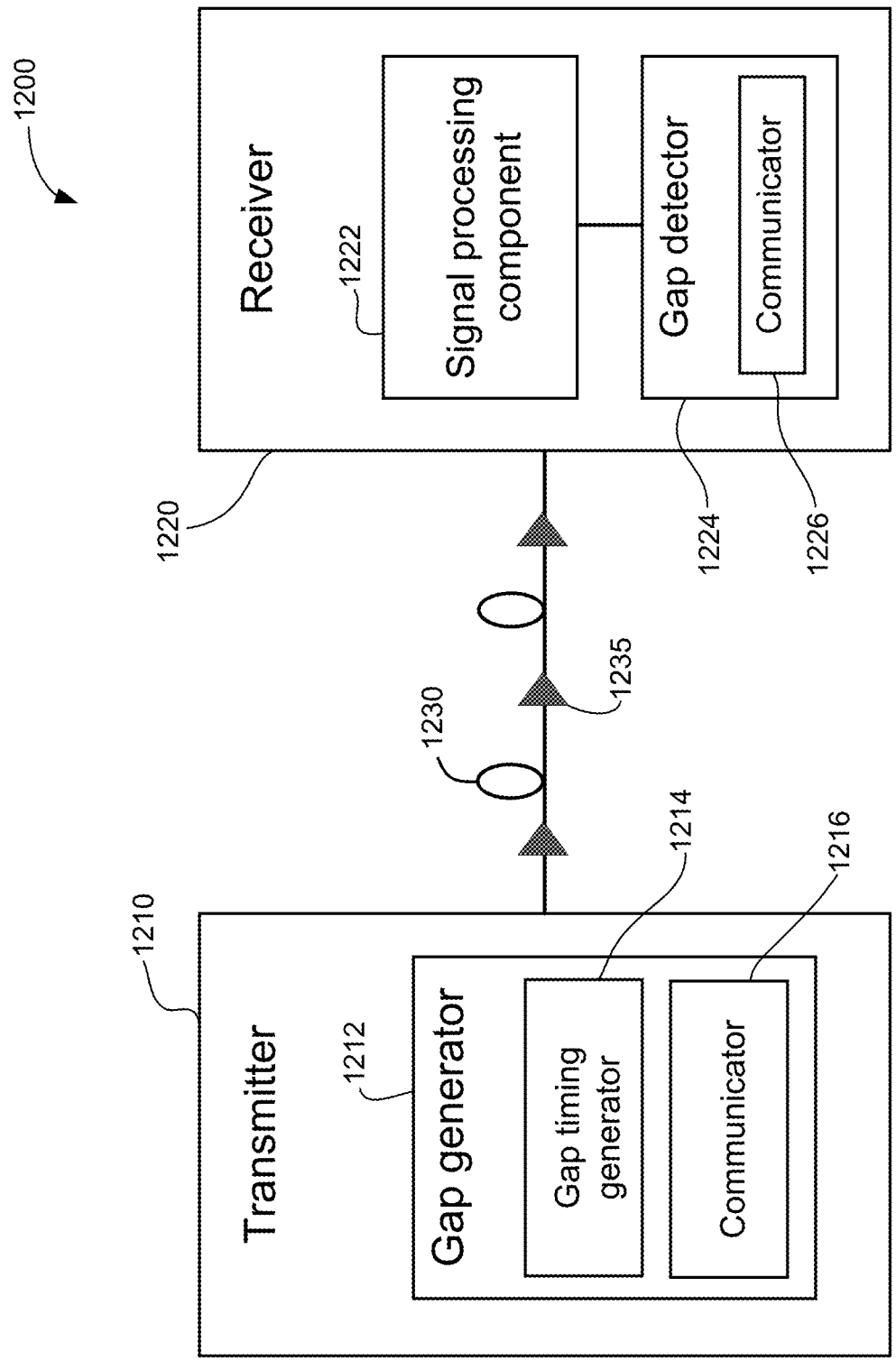
FIG. 12 is a schematic diagram of a system for determining multipath interference (MPI) in an optical communication system, according to embodiments of the present disclosure.

FIG. 12 is a schematic diagram of a system 1200 for determining multipath interference (MPI) in an optical communication system that may perform any or all of the steps of the above methods and features described herein, according to different embodiments of the present invention.

As shown, the system 1200 includes a transmitter 1210 and a receiver 1220. The transmitter 1210 and the receiver 1220 are communicatively connected to each other via optical fiber spans 1230. According to certain embodiments, the transmitter 1210 may be an optical transmitter, and/or the receiver 1220 may be a coherent receiver or non-coherent (direct detection) receiver. Across the optical fiber spans 1230, there may be one or more optical amplifiers 1235, which compensate for loss of the optical fiber spans 1230 and potentially various other components (not shown) placed across the optical fiber spans 1230. The optical amplifiers 1235 are communicatively connected to each other using the optical fiber span 1230. It should be noted that there may be no optical amplifier, for example in the case of passive optical networks (PON). The optical fiber span 1230 is the transmission medium conveying channels. According to certain embodiments, the optical fiber span 1230 may be made of Standard Single Mode Fiber (SSMF) (G.652) or ELEAF (G.655). Each optical fiber span 1230 can be a few kilometers to hundreds of kilometers or more in length (i.e. span length is a few kilometers to hundreds of kilometers or more). There may be one to a few tens of fiber spans 1230 in the system 1200. According to certain embodiments, any or all of the depicted elements may be utilized, or only a subset of the elements. Further, the system 1200 may contain multiple instances of certain elements, such as multiple transmitters and/or receivers. In such cases, the system 1200 may further include a multiplexer and/or a de-multiplexer, which are communicatively connected to the transmitters and the receivers, respectively.

In some embodiments the receiver receives the optical signals and processes same for data content. In other embodiments, the receiver does not necessarily process the optical signals for content, but is a monitoring device (e.g. substantially only) for monitoring MPI at a particular location along an optical link. For example, the receiver may be co-located with one of the optical amplifiers 1235.

The transmitter 1210 includes a gap generator 1212. The gap generator 1212 is configured to generate zero-power gaps (sequentially in time) to be inserted into the signal (e.g. main signal) that will be transmitted from the transmitter 1210 to the receiver 1220. According to certain embodiments, the zero-power gaps will be inserted into the signal in accordance with the timing calculated by a gap timing generator 1214. In some embodiments, in order to calculate appropriate timing to insert the zero-power gaps, the gap timing generator 1214 may receive feedback from the receiver regarding the zero-power gaps, for example whether or not the zero-power gaps inserted in the main signal overlap the zero-power gaps of the reflection of the main signal, or the current minimum time difference $\tau_R$ as in FIG. 4B. Using the received feedback, the gap timing generator 1214 may determine and configure the timings to insert the zero-power gaps such that at least some of the zero-power gaps inserted in the main signal do not overlap (at the receiver) the zero-power gaps of the reflection of the main signal. In some embodiments, the gap timing generator may determine and configure the timings so that some but not all of the zero-power gaps inserted in the main signal overlap (at the receiver) the zero-power gaps of the reflection of the main signal. To receive such feedback, the gap generator 1212 further includes a communicator 1216 configured to communicate with a corresponding communicator 1226 of the receiver 1220 to receive feedback about the timings of the zero-power gaps. In other embodiments, the gap timing generator operates in an open-loop manner, without feedback. The components in the transmitter 1210 are communicatively connected to each other, for example via bi-directional bus or may be directly coupled to each other without the bi-directional bus.

The receiver 1220 includes a signal processing component 1222 and a gap detector 1224. The signal processing component 1222 is configured to processing a received signal. According to certain embodiments, the signal processing component 1222 may be a conventional digital signal processor (DSP). In some other embodiments, the signal processing component 1222 may be an analog signal processor. The signal may be modified by one or more additional components in the receiver 1220 before being processed by the signal processing component 1222. According to certain embodiments, the one or more additional components may include a polarization and phase diversity hybrid mixer, a balanced photo detector and/or an analog-to-digital converter. The gap detector 1224 detects the zero-power gaps inserted in the received signals (e.g. main signal and reflection of the main signal), and calculates the power of the signals outside the zero-power gaps and inside the zero-power gaps, according to aforementioned method steps described above. In some embodiments, the gap detector 1224 includes a communicator 1226 configured to communicate with the transmitter 1210 to provide feedback about the timings of the zero-power gaps inserted in the signals, for example whether or not the zero-power gaps inserted in the main signal overlap the zero-power gaps of the reflection of the main signal, or the time difference $\tau_R$, or other useful feedback information. The communicator 1226 may send the feedback to the communicator 1216 of the transmitter 1210. The components in the receiver 1220 are communicatively connected to each other, for example via bi-directional bus or may be directly coupled to each other without the bi-directional bus.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Acts associated with the method described herein can be implemented as coded instructions in plural computer program products. For example, a first portion of the method may be performed using one computing device, and a second portion of the method may be performed using another computing device, server, or the like. In this case, each computer program product is a computer-readable medium upon which software code is recorded to execute appropriate portions of the method when a computer program product is loaded into memory and executed on the microprocessor of a computing device.

Further, each step of the method may be executed on any computing device, such as a personal computer, server, PDA, or the like and pursuant to one or more, or a part of one or more, program elements, modules or objects generated from any programming language, such as C++, Java, or the like. In addition, each step, or a file or object or the like implementing each said step, may be executed by special purpose hardware or a circuit module designed for that purpose.

It is obvious that the foregoing embodiments of the invention are examples and can be varied in many ways. Such present or future variations are not to be regarded as a departure from the spirit and scope of the invention, and all such modifications as would be obvious to one skilled in the art are intended to be included within the scope of the following claims.

I claim:

1. A method for determining multipath interference (MPI) in an optical communication system comprising:
   receiving a main signal superimposed with a reflection of the main signal, the main signal including one or more zero-power gaps in time domain;
   determining power outside the zero-power gaps of the main signal and power inside the zero-power gaps of the main signal; and
determining strength of the MPI based on the power outside the zero-power gaps of the main signal, the power inside the zero-power gaps of the main signal or both,
wherein the one or more zero-power gaps induce one or more corresponding zero-power gaps in the reflection of the main signal, and at least some of the zero-power gaps of the main signal are non-overlapping in time with the corresponding zero-power gaps of the reflection.

2. The method of claim 1, wherein a duration of each zero-power gap is greater than one symbol length in time.

3. The method of claim 1, wherein the zero-power gaps are uniformly distributed in time.

4. The method of claim 1, wherein the zero-power gaps are non-uniformly distributed in time.

5. The method of claim 4, further comprising:
   measuring a first power within a first type of zero-power gap of the main signal, the first type defined as being non-overlapping with all of the zero-power gaps in the reflection;
   measuring a second power within a second type of zero-power gap of the main signal, the second type defined as being overlapping with a respective one of the zero-power gaps in the reflection;
   determining a difference between the first power and the second power; and
   determining the MPI based at least in part on the difference.

6. A method for determining multipath interference (MPI) in an optical communication system comprising:
   receiving a main signal superimposed with a reflection of the main signal, the main signal including one or more zero-power gaps in time domain;
   determining power outside the zero-power gaps of the main signal and power inside the zero-power gaps of the main signal; and
determining strength of the MPI based on the power outside the zero-power gaps of the main signal, the power inside the zero-power gaps of the main signal or both, wherein the zero-power gaps are non-uniformly distributed in time, the method further comprising:
   measuring, at a first time, a first time-resolved power within a first zero-power gap of the main signal, the first zero-power gap being partially overlapping with a respective one of the zero-power gaps in the reflection, the first power indicative of power with MPI;
   measuring, at a second time, a second time-resolved power within the first zero-power gap of the main signal, the second power indicative of power without MPI;
   determining a difference between the first power and the second power; and
   determining the MPI based at least in part on the difference.

7. A method for supporting determination of multipath interference (MPI) in an optical communication system comprising:
   inserting one or more zero-power gaps into a main signal in time domain; and
   transmitting the main signal with the one or more zero-power gaps,
wherein power outside the zero-power gaps of the main signal, power inside the zero-power gaps of the main signal or both is used for determining strength of the MPI,
wherein the one or more zero-power gaps induce one or more corresponding zero-power gaps in a reflection of the main signal, and at least some of the zero-power gaps of the main signal is non-overlapping in time with the corresponding zero-power gaps of the reflection.

8. The method of claim 7, wherein a duration of each zero-power gap is greater than one symbol length in time.

9. The method of claim 7, wherein the zero-power gaps are uniformly distributed in time.

10. The method of claim 7, wherein the zero-power gaps are non-uniformly distributed in time.

11. The method of claim 10, wherein inserting the one or more zero-power gaps includes:
   inserting a first type of zero-power gaps of the main signal, the first type defined as being non-overlapping with all of the zero-power gaps in the reflection; and
   inserting a second type of zero-power gaps of the main signal, the second type defined as being overlapping with a respective one of the zero-power gaps in the reflection.

12. The method of claim 11, wherein timing of transmission of the first type of zero-power gap of the main signal, the second type of zero-power gap of the main signal, or both, is adjusted to induce said first type of zero-power gap and said second type of zero-power gap at a corresponding receiver.

13. An apparatus for determining multipath interference (MPI) in an optical communication system comprising:
a processor; and
a non-transient memory for storing instructions that when executed by the processor cause the network function to be configured for:
receiving a main signal superimposed with a reflection of the main signal, the main signal including one or more zero-power gaps in time domain, said one or more zero-power gaps;
determining power outside the zero-power gaps of the main signal and power inside the zero-power gaps of the main signal; and
determining strength of the MPI based on the power outside the zero-power gaps of the main signal, the power inside the zero-power gaps of the main signal or both,
wherein the one or more zero-power gaps induce one or more corresponding zero-power gaps in the reflection of the main signal, and at least some of the zero-power gaps of the main signal are non-overlapping in time with the corresponding zero-power gaps of the reflection.

14. The apparatus of claim 13, wherein a duration of each zero-power gap is greater than one symbol length in time.

15. The apparatus of claim 13, wherein the zero-power gaps are uniformly distributed in time.

16. The apparatus of claim 13, wherein the zero-power gaps are non-uniformly distributed in time.

17. The apparatus of claim 16, wherein the non-transient readable memory when executed by the processor further configure the apparatus for:
measuring a first power within a first type of zero-power gap of the main signal, the first type defined as being non-overlapping with all of the zero-power gaps in the reflection;
measuring a second power within a second type of zero-power gap of the main signal, the second type defined as being overlapping with a respective one of the zero-power gaps in the reflection;
determining a difference between the first power and the second power; and
determining the MPI based at least in part on the difference.

18. An apparatus for determining multipath interference (MPI) in an optical communication system comprising:
a processor; and
a non-transient memory for storing instructions that when executed by the processor cause the network function to be configured for:
receiving a main signal superimposed with a reflection of the main signal, the main signal including one or more zero-power gaps in time domain, said one or more zero-power gaps;
determining power outside the zero-power gaps of the main signal and power inside the zero-power gaps of the main signal; and
determining strength of the MPI based on the power outside the zero-power gaps of the main signal, the power inside the zero-power gaps of the main signal or both, wherein the zero-power gaps are non-uniformly distributed in time, and wherein the non-transient readable memory when executed by the processor further configure the apparatus for:
measuring, at a first time, a first time-resolved power within a first zero-power gap of the main signal, the first zero-power gap being partially overlapping with a respective one of the zero-power gaps in the reflection, the first power indicative of power with MPI;
measuring, at a second time, a second time-resolved power within the first zero-power gap of the main signal, the second power indicative of power without MPI;
determining a difference between the first power and the second power; and
determining the MPI based at least in part on the difference.

19. An apparatus for supporting determination of multipath interference (MPI) in an optical communication system comprising:
a processor; and
a non-transient memory for storing instructions that when executed by the processor cause the network function to be configured for:
inserting one or more zero-power gaps into a main signal in time domain, said one or more zero-power gaps; and
transmitting the main signal with the one or more zero-power gaps,
wherein power outside the zero-power gaps of the main signal, power inside the zero-power gaps of the main signal or both is used for determining strength of the MPI,
wherein the one or more zero-power gaps induce one or more corresponding zero-power gaps in a reflection of the main signal, and at least some of the zero-power gaps of the main signal are non-overlapping in time with the corresponding zero-power gaps of the reflection.

20. The apparatus of claim 19, wherein a duration of each zero-power gap is greater than one symbol length in time.

21. The apparatus of claim 19, wherein the zero-power gaps are uniformly distributed in time.

22. The apparatus of claim 19, wherein the zero-power gaps are non-uniformly distributed in time.

23. The method of claim 22, wherein inserting the one or more zero-power gaps includes:
inserting a first type of zero-power gaps of the main signal, the first type defined as being non-overlapping with all of the zero-power gaps in the reflection; and
inserting a second type of zero-power gaps of the main signal, the second type defined as being overlapping with a respective one of the zero-power gaps in the reflection.

24. The method of claim 23, wherein timing of transmission of the first type of zero-power gap of the main signal, the second type of zero-power gap of the main signal, or both, is adjusted to induce said first type of zero-power gap and said second type of zero-power gap at a corresponding receiver.

* * * * *